United States Patent [19]
Sato et al.

[11] Patent Number: 5,548,691
[45] Date of Patent: Aug. 20, 1996

[54] PRINTING AND PRINT INSPECTION APPARATUS

[75] Inventors: Toshio Sato; Hiroaki Kubota, both of Yokohama, Japan

[73] Assignee: Kabushiki Kaisha Toshiba, Kawasaki, Japan

[21] Appl. No.: 364,981

[22] Filed: Dec. 28, 1994

[30] Foreign Application Priority Data

Dec. 28, 1993 [JP] Japan .................................. 5-354180

[51] Int. Cl.$^6$ ...................................................... G06K 15/00
[52] U.S. Cl. ......................................... 395/113; 395/111
[58] Field of Search .................................... 395/105, 111, 395/112, 113, 106, 101; 355/313, 314, 323; 101/42–43, 2; 271/287, 288, 289, 290, 298, 279; 400/50, 54

[56] References Cited

U.S. PATENT DOCUMENTS 4,448,121  5/1984  Uno et al. ................................. 101/76
4,561,765  12/1985  Masuda .................................. 355/145 H

FOREIGN PATENT DOCUMENTS 4-24228  4/1992  Japan .

*Primary Examiner*—Arthur G. Evans
*Attorney, Agent, or Firm*—Cushman Darby & Cushman L.L.P.

[57] ABSTRACT

A paper sheet P is fed to a transport mechanism, which conveys the sheet to a printer section, which prints a pattern on the sheet P. The image data on the printed sheet is supplied to an image input section, and compared with standard data at a print inspect section. The compared image data is sent to data display sections as the occasion demands and judged to be acceptable or unacceptable at judgment input sections. The judgment results are sent to a sort mechanism, which discards unacceptable printed matter P. This printing apparatus allows the judge to make a final judgment on printed matter containing minute defects or faint defects that the inspecting process cannot judge, and collects the judgment results, thereby being capable of printing while sorting only acceptable products accurately without lengthening the processing time.

14 Claims, 22 Drawing Sheets

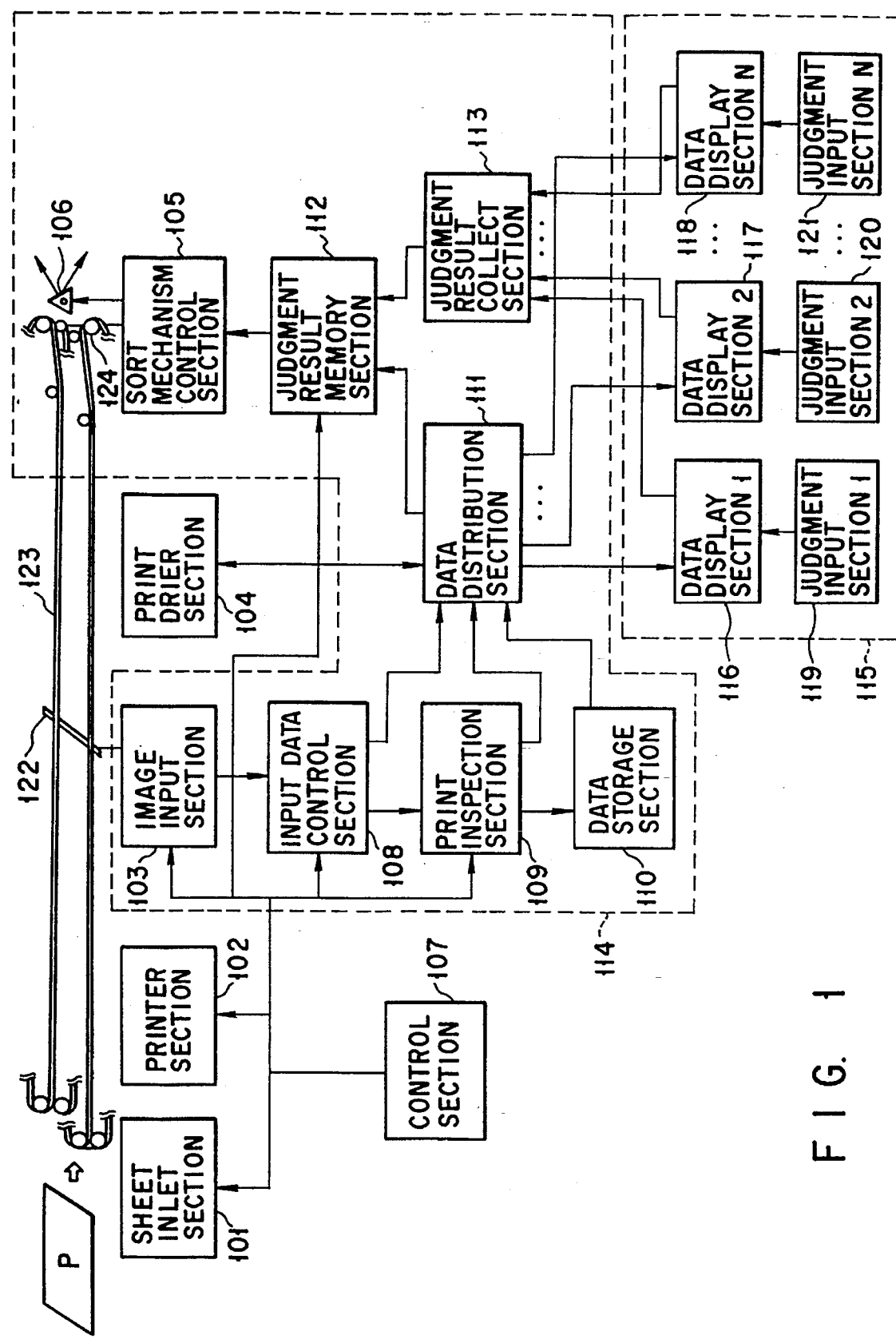
F I G. 1

FIG. 4

512 PIXELS
1024 PIXELS

| | | | | | | | | | | | | | |
|---|---|---|---|---|---|---|---|---|---|---|---|---|---|
| $C8_H$ | $60_H$ | $C8_H$ | $60_H$ | $C8_H$ | $60_H$ | $C8_H$ | $61_H$ | $C8_H$ | $C8_H$ | $60_H$ | | 0 | 0 |
| $60_H$ | $68_H$ | $60_H$ | $60_H$ | $C8_H$ | $62_H$ | $C8_H$ | $60_H$ | $C8_H$ | $C7_H$ | $60_H$ | | 0 | 0 |
| $C8_H$ | $60_H$ | $C8_H$ | $40_H$ | $60_H$ | $60_H$ | $C8_H$ | $40_H$ | $40_H$ | $40_H$ | $40_H$ | | 0 | 0 |
| $60_H$ | $C7_H$ | $C8_H$ | $40_H$ | $C8_H$ | $40_H$ | $C7_H$ | $C7_H$ | $C7_H$ | $C8_H$ | $C8_H$ | | 0 | 0 |
| $C6_H$ | $60_H$ | $C8_H$ | $40_H$ | $C8_H$ | $40_H$ | $C8_H$ | $41_H$ | $41_H$ | $40_H$ | $40_H$ | | 0 | 0 |
| $5E_H$ | $C8_H$ | $40_H$ | $C7_H$ | $C8_H$ | $42_H$ | $C8_H$ | $40_H$ | $C7_H$ | $C7_H$ | $C8_H$ | | 0 | 0 |
| $C8_H$ | $5F_H$ | $C7_H$ | $40_H$ | $C8_H$ | $42_H$ | $C7_H$ | $40_H$ | $C7_H$ | $41_H$ | $40_H$ | | 0 | 0 |
| $5E_H$ | $C7_H$ | $40_H$ | $C8_H$ | $C8_H$ | $42_H$ | $C7_H$ | $40_H$ | $C8_H$ | $40_H$ | $C8_H$ | | 0 | 0 |
| $C7_H$ | $5E_H$ | $C8_H$ | $40_H$ | $C8_H$ | $42_H$ | $C7_H$ | $40_H$ | $C8_H$ | $C8_H$ | $40_H$ | | 0 | 0 |
| $5E_H$ | $C7_H$ | $C8_H$ | $40_H$ | $C8_H$ | $42_H$ | $C8_H$ | $C8_H$ | $40_H$ | $41_H$ | $41_H$ | | 0 | 0 |
| $C8_H$ | $5E_H$ | $C8_H$ | $40_H$ | $C7_H$ | $42_H$ | $C7_H$ | $C8_H$ | $C8_H$ | $40_H$ | $40_H$ | | 0 | 0 |
| | | | | | | ... | | | | | | 0 | 0 |
| | | | | | | | | | | | | 0 | 0 |
| | | | | | | | | | | | | 0 | 0 |
| 0 | 0 | 0 | 0 | 0 | 0 | 0 | 0 | 0 | 0 | 0 | | 0 | 0 |
| 0 | 0 | 0 | 0 | 0 | 0 | 0 | 0 | 0 | 0 | 0 | | 0 | 0 |
| 0 | 0 | 0 | 0 | 0 | 0 | 0 | 0 | 0 | | | | 0 | 0 |

|  | | | | | | | | | | | | | | | | |
|---|---|---|---|---|---|---|---|---|---|---|---|---|---|---|---|---|
| 0 | C9H | 61H | CDH | C8H | 5FH | 58H | C0H | 62H | C8H | 61H | 61H | C8H | ... | 0 | 0 | 0 |
| 400H | 60H | 68H | 6AH | D4H | C0H | 58H | C8H | 60H | 60H | C8H | C7H | 60H | ... | 0 | 0 | 0 |
| 800H | C8H | 60H | C8H | 4AH | 3AH | 36H | C8H | 40H | 40H | 40H | 40H | 40H | ... | 0 | 0 | 0 |
| ... | 60H | C7H | C8H | 48H | 4AH | C8H | C1H | BDH | C7H | C8H | C8H | C8H | ... | | | |
| | C6H | 60H | C8H | 45H | C8H | C1H | BDH | C7H | C8H | C8H | C8H | C8H | ... | | | |
| | C6H | 60H | C8H | 48H | C9H | 41H | 40H | 40H | 41H | 40H | 40H | 40H | ... | | | |
| | 5EH | C8H | C7H | 49H | CDH | 43H | C2H | BFH | C3H | C5H | C8H | C8H | ... | 0 | 0 | 0 |
| | C8H | 57H | C7H | 47H | C9H | 42H | C7H | 40H | 40H | 40H | 41H | 40H | ... | 0 | 0 | 0 |
| | 5EH | C7H | C8H | 45H | C8H | 42H | C7H | 40H | C8H | C8H | C8H | C8H | ... | 0 | 0 | 0 |
| | C7H | 5EH | C8H | 49H | C9H | 42H | C7H | 40H | C8H | C8H | C8H | C8H | ... | 0 | 0 | 0 |
| | 5EH | C7H | C8H | 44H | CAH | 42H | C7H | 40H | C8H | C8H | 40H | 40H | ... | 0 | 0 | 0 |
| | C8H | 5EH | C8H | 40H | C7H | 42H | C6H | 40H | C8H | C8H | 41H | 41H | 44H | ... | 0 | 0 | 0 |
| | C8H | 5EH | C8H | C8H | C7H | C6H | 40H | 40H | C8H | C8H | 40H | 40H | 40H | ... | 0 | 0 | 0 |
| | | | | | | | | | | | | | ... | | | |
| | | | | | | | | | | | | | | 0 | 0 | 0 |
| | | | | | | | | | | | | | | 0 | 0 | 0 |
| | | | | | | | | | | | | | | 0 | 0 | 0 |
| CF00H | 0 | 0 | 0 | 0 | 0 | 0 | 0 | 0 | 0 | 0 | 0 | 0 | ... | 0 | 0 | 0 |

512 PIXELS

1024 PIXELS

FIG. 6

| | 0 | 400H | 800H | C00H | .... | | | | | | | | 7F800H | 7FC00H |
|---|---|---|---|---|---|---|---|---|---|---|---|---|---|---|
| | -1 | 0 | 0 | 0 | 0 | 0 | 0 | 0 | 0 | 0 | 0 | | 0 | 0 |
| | -1 | 0 | 0 | 0 | 0 | 0 | +8 | 0 | 0 | 0 | 0 | | 0 | 0 |
| | -5 | -10 | 0 | 0 | 0 | 0 | 0 | 0 | 0 | 0 | 0 | | 0 | 0 |
| | 0 | -10 | -8 | -5 | -8 | -9 | -7 | -5 | -8 | -4 | 0 | | 0 | 0 |
| | +1 | -12 | -10 | -1 | -1 | -5 | -1 | 0 | -1 | -2 | 0 | | 0 | 0 |
| | +9 | +8 | +4 | +6 | 0 | -1 | 0 | 0 | 0 | 0 | 0 | | 0 | 0 |
| | +8 | +5 | +10 | +10 | 0 | +5 | 0 | 0 | 0 | 0 | 0 | | 0 | 0 |
| | 0 | 0 | 0 | 0 | 0 | +8 | 0 | 0 | 0 | 0 | 0 | | 0 | 0 |
| | 0 | 0 | 0 | 0 | 0 | +5 | 0 | 0 | 0 | 0 | 0 | | 0 | 0 |
| | 0 | 0 | 0 | 0 | 0 | +8 | 0 | 0 | 0 | 0 | 0 | | 0 | 0 |
| | 0 | 0 | 0 | 0 | 0 | +4 | 0 | 0 | 0 | 0 | 0 | | 0 | 0 |
| | 0 | 0 | 0 | 0 | 0 | +2 | 0 | 0 | 0 | 0 | 0 | | 0 | 0 |
| | 0 | 0 | 0 | 0 | 0 | 0 | 0 | 0 | 0 | 0 | 0 | | 0 | 0 |
| | ... | ... | ... | ... | ... | ... | ... | ... | ... | ... | ... | | ... | ... |
| | 0 | 0 | 0 | 0 | 0 | 0 | 0 | 0 | 0 | 0 | 0 | | 0 | 0 |
| | 0 | 0 | 0 | 0 | 0 | 0 | 0 | 0 | 0 | 0 | 0 | | 0 | 0 |
| | 0 | 0 | 0 | 0 | 0 | 0 | 0 | 0 | 0 | 0 | 0 | | 0 | 0 |

512 PIXELS / 1024 PIXELS

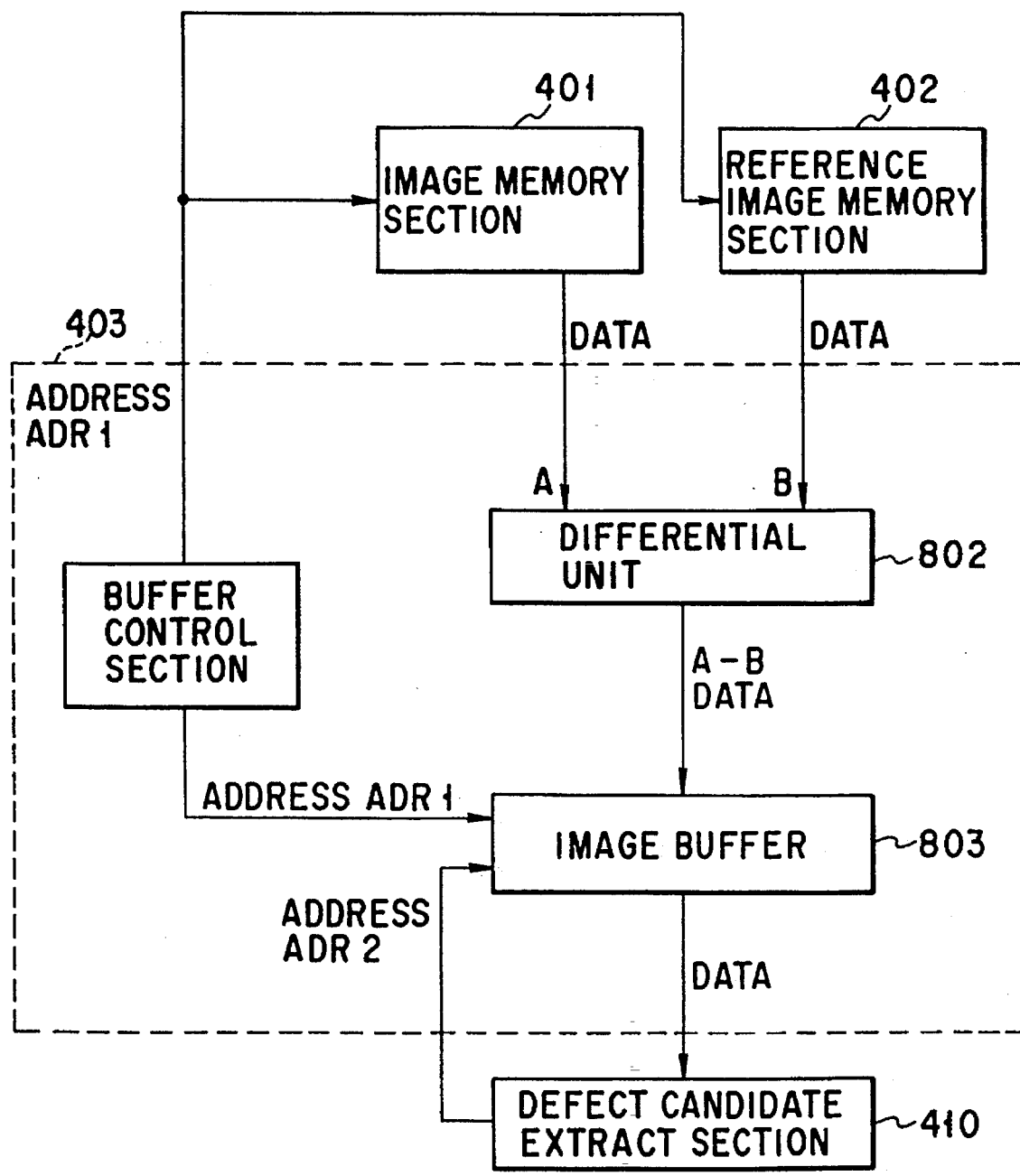
F I G. 7

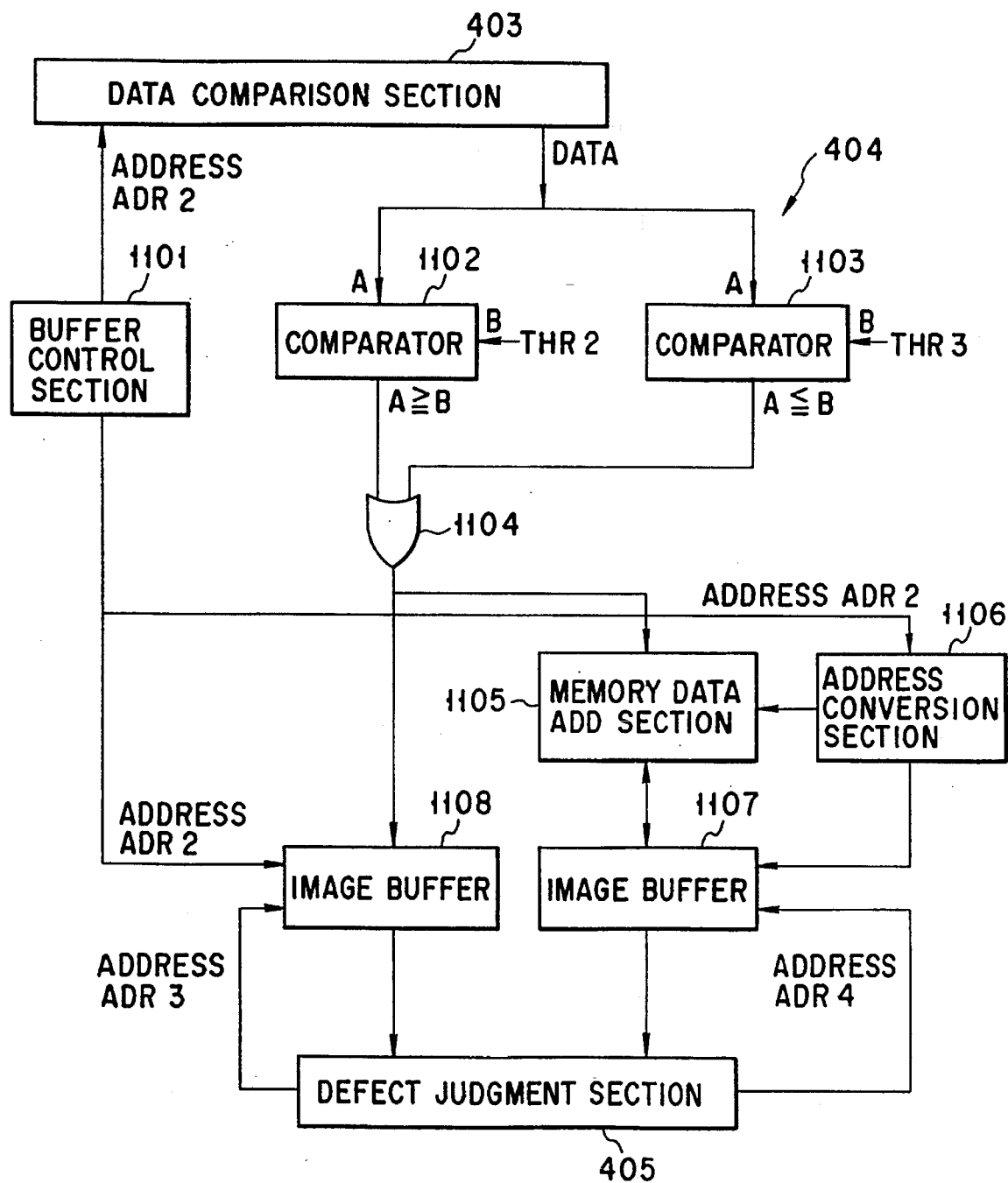
F I G. 10

FIG. 12

| | LOGICAL OPERATION SECTION | | | | | | DESCRIPTION | TRANSFER ROUTE |
|---|---|---|---|---|---|---|---|---|
| | INPUT | | OUTPUT | | | LEVEL | | |
| | A | B | C | D | E | | | |
| MODE 1 | 0 | 0 | 0 | 0 | 1 | 3 | INSPECT ALL SAMPLES (AUTOMATIC SORTING IMPOSSIBLE) | INSPECTION STATION |
| | 0 | 1 | 0 | 0 | 1 | 3 | | |
| | 1 | 0 | 0 | 0 | 1 | 3 | | |
| | 1 | 1 | 0 | 0 | 1 | 3 | | |
| MODE 2 | 0 | 1 | 0 | 1 | 0 | 2 | OBVIOUSLY DEFECTIVE PRODUCTS (AUTOMATIC SORTING POSSIBLE) | JUDGMENT RESULT MEMORY SECTION EMERGENCY SIGNAL |
| | 1 | 1 | 0 | 1 | 0 | 2 | | |
| | 1 | 0 | 0 | 0 | 1 | 3 | INSPECTION NEEDED (AUTOMATIC SORTING IMPOSSIBLE) | INSPECTION STATION |
| | 0 | 0 | 0 | 0 | 1 | 3 | | |
| MODE 3 | 0 | 0 | 1 | 0 | 0 | 1 | OBVIOUSLY ACCEPTABLE PRODUCTS (AUTOMATIC SORTING POSSIBLE) | JUDGMENT RESULT MEMORY SECTION |
| | 1 | 1 | 0 | 0 | 1 | 3 | INSPECTION NEEDED (AUTOMATIC SORTING IMPOSSIBLE) | INSPECTION STATION |
| | 0 | 1 | 0 | 0 | 1 | 3 | | |
| | 1 | 0 | 0 | 0 | 1 | 3 | | |
| MODE 4 | 0 | 1 | 0 | 1 | 0 | 2 | OBVIOUSLY DEFECTIVE PRODUCTS (AUTOMATIC SORTING POSSIBLE) | JUDGMENT RESULT MEMORY SECTION EMERGENCY SIGNAL |
| | 1 | 1 | 0 | 1 | 0 | 2 | | |
| | 0 | 0 | 1 | 0 | 0 | 1 | OBVIOUSLY ACCEPTABLE PRODUCTS (AUTOMATIC SORTING POSSIBLE) | JUDGMENT RESULT MEMORY SECTION |
| | 1 | 0 | 0 | 0 | 1 | 3 | INSPECTION NEEDED (AUTOMATIC SORTING IMPOSSIBLE) | INSPECTION STATION |

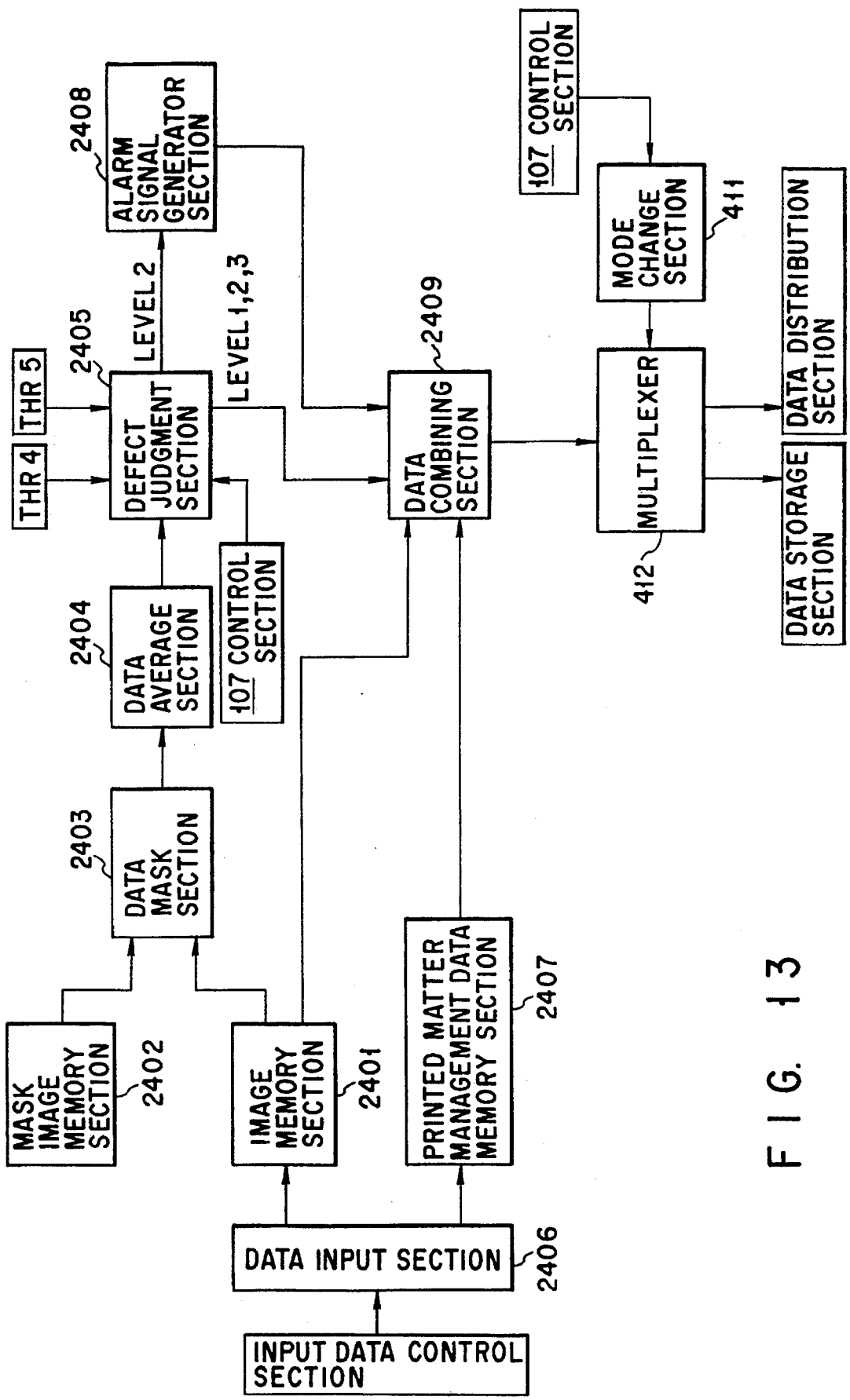
F I G. 13

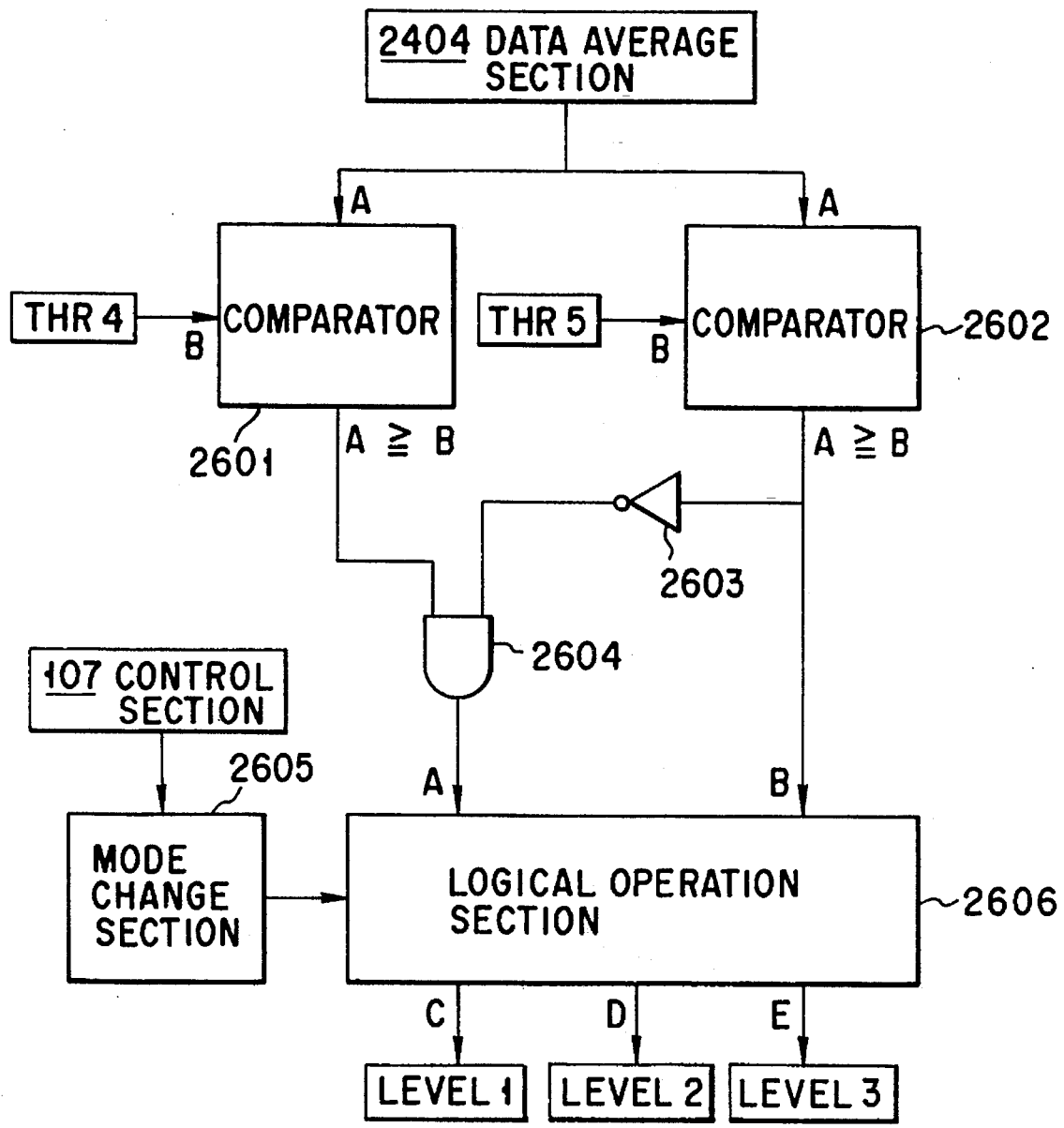
F I G. 14

| i−1,j−1 | i,j−1 | i+1,j−1 |
|---|---|---|
| i−1,j | i,j | i+1,j |
| i−1,j+1 | i,j+1 | i+1,j+1 |

FIG. 16A

| 1 | 1 | 1 |
|---|---|---|
| 1 | 2 | 1 |
| 1 | 1 | 1 |

FIG. 16B

| −1 | 0 | 1 |
|---|---|---|
| −1 | 0 | 1 |
| −1 | 0 | 1 |

FIG. 16C

| −1 | −1 | −1 |
|---|---|---|
| 0 | 0 | 0 |
| 1 | 1 | 1 |

FIG. 16D

| −1 | −1 | −1 |
|---|---|---|
| −1 | 8 | −1 |
| −1 | −1 | −1 |

JUDGMENT  LEVEL 1

---

ID        0022

JUDGMENT  LEVEL 2

ALARM     PRINTING DEFECT

---

ID        0023

JUDGMENT  LEVEL 3

NO. OF AREAS   2

CANDIDATE AREA 1 x COORDINATE 26~30 IMAGE DATA

| 120 | 125 | 87  | 230 | 85  | 84  |
|-----|-----|-----|-----|-----|-----|
| 121 | 122 | 95  | 230 | 98  | 97  |
| 123 | 123 | 108 | 230 | 112 | 97  |
| 121 | 124 | 105 | 240 | 115 | 104 |
| 118 | 120 | 98  | 99  | 112 | 101 | y COORDINATE 86~90

| 0 | 0 | 0 | 1 | 0 | 0 |
|---|---|---|---|---|---|
| 0 | 0 | 0 | 1 | 0 | 0 |
| 0 | 0 | 0 | 1 | 0 | 0 |
| 0 | 0 | 0 | 1 | 0 | 0 |
| 0 | 0 | 0 | 0 | 0 | 0 |

CANDIDATE AREA 2 x COORDINATE 31~35

| 65 | 43  | 60  | 83  | 65 | 28 |
|----|-----|-----|-----|----|----|
| 55 | 230 | 120 | 83  | 45 | 98 |
| 56 | 32  | 65  | 230 | 98 | 83 |
| 48 | 59  | 93  | 45  | 85 | 95 |
| 66 | 83  | 38  | 75  | 72 | 65 | y COORDINATE 86~90

| 0 | 0 | 0 | 0 | 0 | 1 |
|---|---|---|---|---|---|
| 0 | 1 | 0 | 0 | 0 | 0 |
| 0 | 0 | 0 | 1 | 0 | 0 |
| 0 | 0 | 0 | 0 | 0 | 0 |
| 0 | 0 | 1 | 0 | 0 | 0 |

FIG. 17

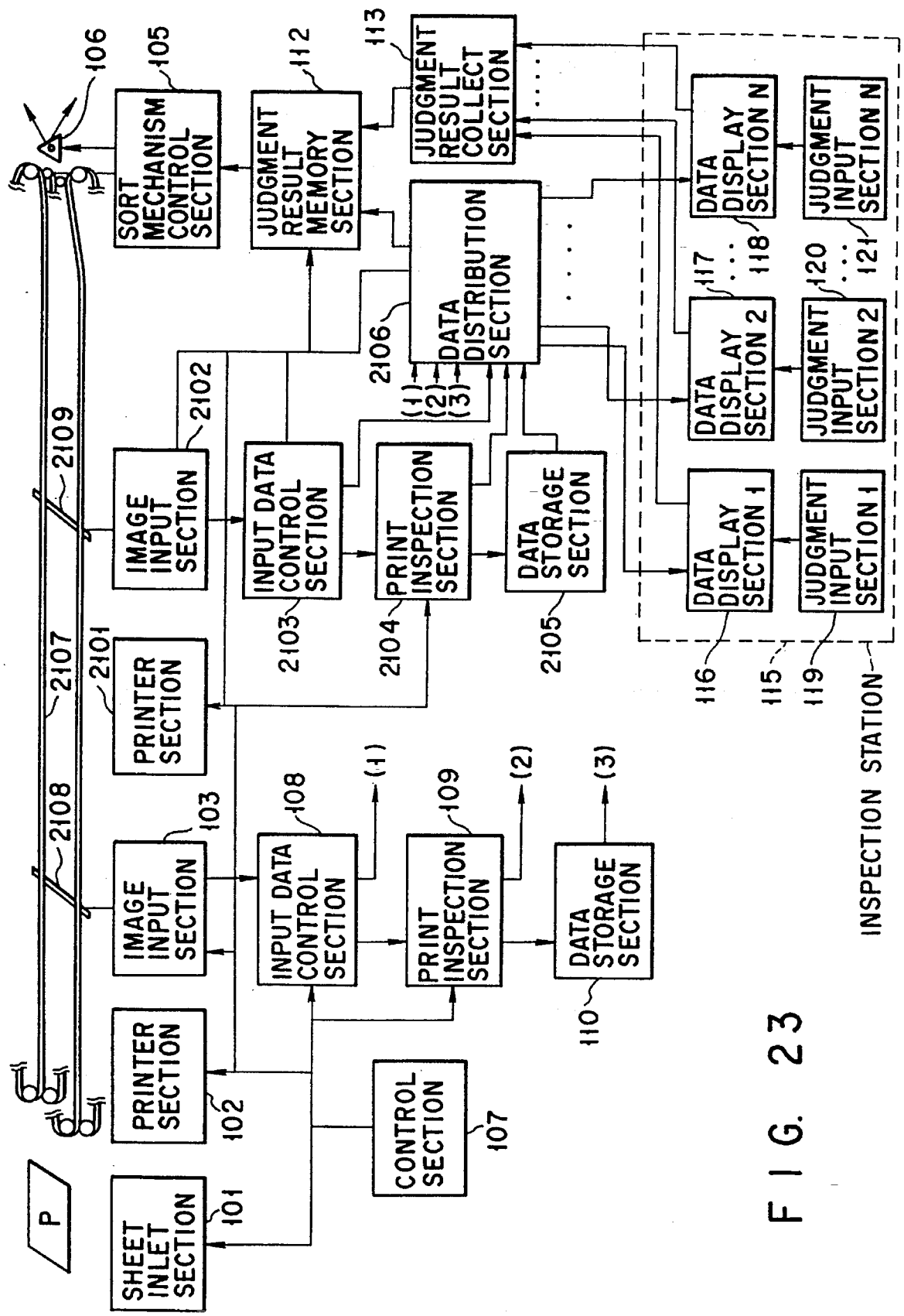
F I G. 23

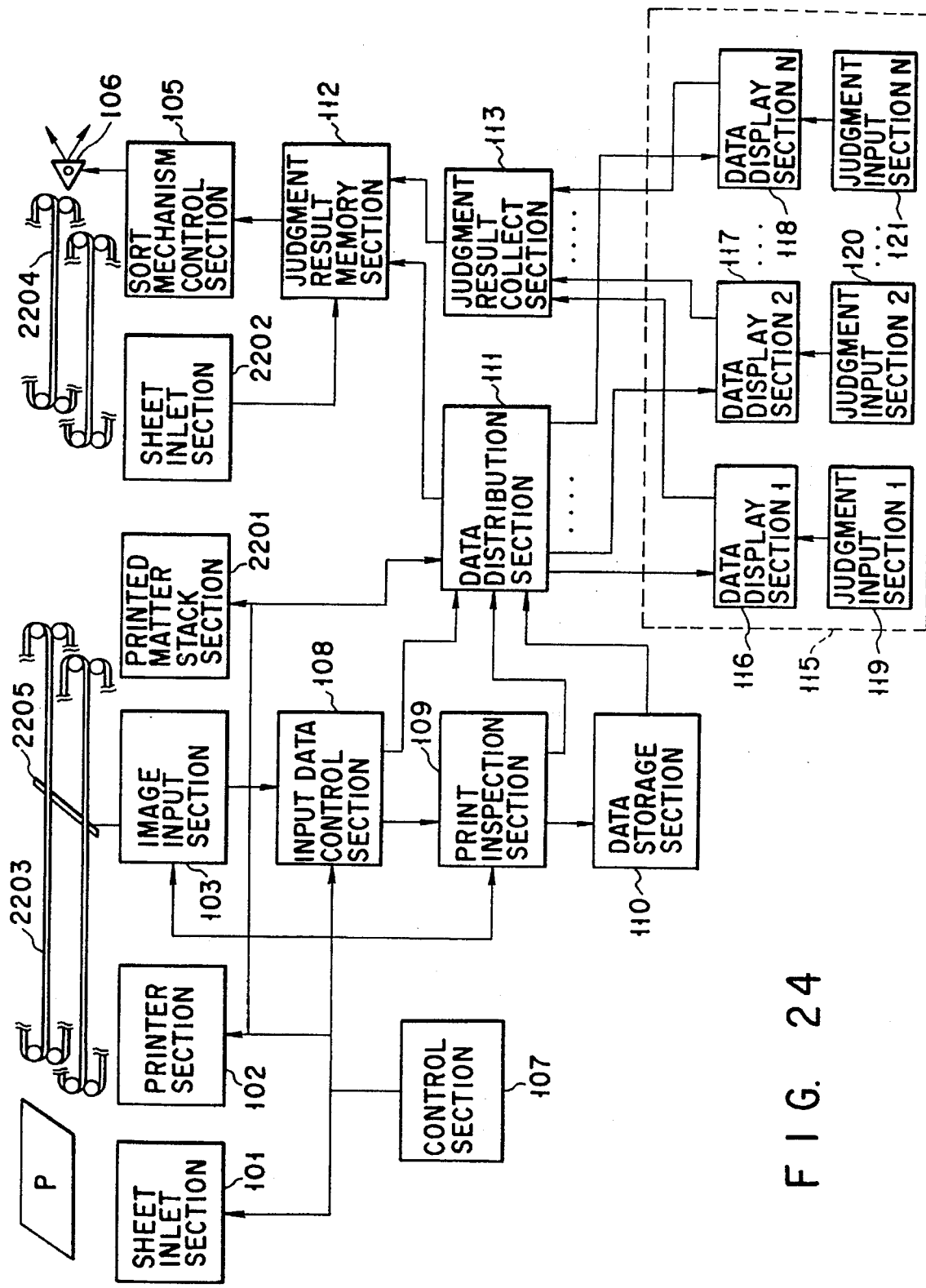
F I G. 24

PRINTING AND PRINT INSPECTION APPARATUS

BACKGROUND OF THE INVENTION

1. Field of the Invention

This invention relates to a printing and print inspection apparatus, and more particularly to a printing and print inspection apparatus which prints and at the same time, inspects printed matter in the form of image read data to sort out only acceptable printed sheets.

2. Description of the Related Art

A printing and inspection method of printing and at the same time, inspecting printed matter in the form of image read data to sort out only acceptable printed sheets has been disclosed in Jpn. Pat. Appln. KOKOKU Publication 4-24228. With the method of inspecting printed matter disclosed in the publication, when the difference between the read-out image data and the reference value has exceeded a preset value, the area is judged to be an error point in the printed matter, and the printed matter is determined to be unacceptable on the basis of the number of error points.

Conventional printing apparatuses with a print inspection and sorting function have widely used a method of sensing defects by density comparison as a printed matter inspection method. With this printing method, since printed matter is sorted out on the basis of the result from the sensing process, when an object containing minute defects or faint defects is inspected, there may be no difference in the sense result between variations in the variable range of acceptable print and actual defects. In this state, in making a highly reliable inspection, an attempt to sort out printed sheets with minute defects and faint defects as defective printed sheets permits part of the acceptable printed sheets with no difference in the sense result to be discarded as defective printed sheets. As a result, the number of sheets of acceptable printed matter decreases, leading to a reduction in the yield of printing and a higher cost.

SUMMARY OF THE INVENTION

An object of the present invention is to provide a printing apparatus which prints while sorting out only acceptable printed sheets accurately without lengthening the processing time, by collecting the final judgment made by the judge on printed matter containing minute defects or faint defects that an inspecting process cannot judge.

According to the invention, there is provided a printing apparatus comprising printing means for printing an image on a paper sheet, reading means for reading the printed image on the paper sheet, inspecting means for inspecting defects on the printed image supplied from the reading means to classify the printed image into one of acceptable print, unacceptable print, and judgment impossible, data display means for displaying the image data outputted from the data inspecting means and classified as judgment impossible at the inspecting means, evaluation data input means for inputting evaluation data about the image displayed on the data display means, and sorting means for sorting printed sheets on the basis of the data outputted from the data inspecting means and the data outputted from the evaluation data input means.

According to the invention, there is also provided a printing apparatus comprising: transport means for conveying a sheet; printing means for printing on a conveyed paper sheet; drying means for drying a printed sheet; image data reading means for reading images on a printer sheet before drying; data inspecting means for inspecting the quality of or the good or bad of the image data inputted from the image data reading means; data display means for displaying the data outputted from the data inspecting means; evaluation data input means for inputting evaluation data about the image displayed on the data display means before the drying of the printed sheet has finished; and sorting means for sorting the printed sheets passed through a drying process after printing, on the basis of at least one of the data outputted from the data inspecting means and the data outputted from the evaluation data input means.

According to the invention, there is further provided a printing apparatus comprising: printing means for printing on a paper sheet; image data reading means for reading images on a printer sheet; at least one data display means for displaying the data outputted from the image data reading means; data distribution means for distributing the data outputted from the image data reading means to the data display means; evaluation data input means for inputting evaluation data about the image displayed on the data display means; and sorting means for sorting printed sheets on the basis of the data outputted from the evaluation data input means.

With the printing apparatus of the invention, it is possible to realize a printing apparatus which prints while sorting out only acceptable printed sheets accurately without lengthening the processing time, by collecting the final judgment made by the judge on printed matter containing minute defects or faint defects that the inspecting process cannot judge. Since the final judgment is made during the drying process, acceptable printed sheets can be sorted in real time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic block diagram of a printing apparatus according to a first embodiment of the present invention;

FIG. 4 shows an example of image data stored in the image memory section of FIG. 3;

FIG. 5 shows an example of image data stored in the reference image memory section of FIG. 3;

FIG. 6 shows an example of the image differential data outputted from the data comparison section of FIG. 3;

FIG. 7 is a schematic block diagram of the data comparison section of FIG. 3;

FIG. 10 is a schematic block diagram of the defect candidate extract section of FIG. 3;

FIG. 12 illustrate an example of data outputted from the print inspect section of FIG. 1 and stored in the data storage section;

FIG. 13 is another schematic block diagram of the print inspect section of FIG. 1;

FIG. 14 is a schematic block diagram of the data average section of FIG. 13;

FIGS. 16A to 16E are show close pixel values processed at the close pixel computing section of FIG. 14 and examples of weighting used to process these values;

FIG. 17 shows the data outputted from the multiplexers shown in FIGS. 4, 13, and 15;

FIG. 23 is a schematic block diagram of a printing apparatus according to another embodiment of the present invention; and FIG. 24 is a schematic block diagram of a printing apparatus according to still another embodiment of the present invention.

DETAILED DESCRIPTION OF THE PREFERRED EMBODIMENTS

Figure 2:
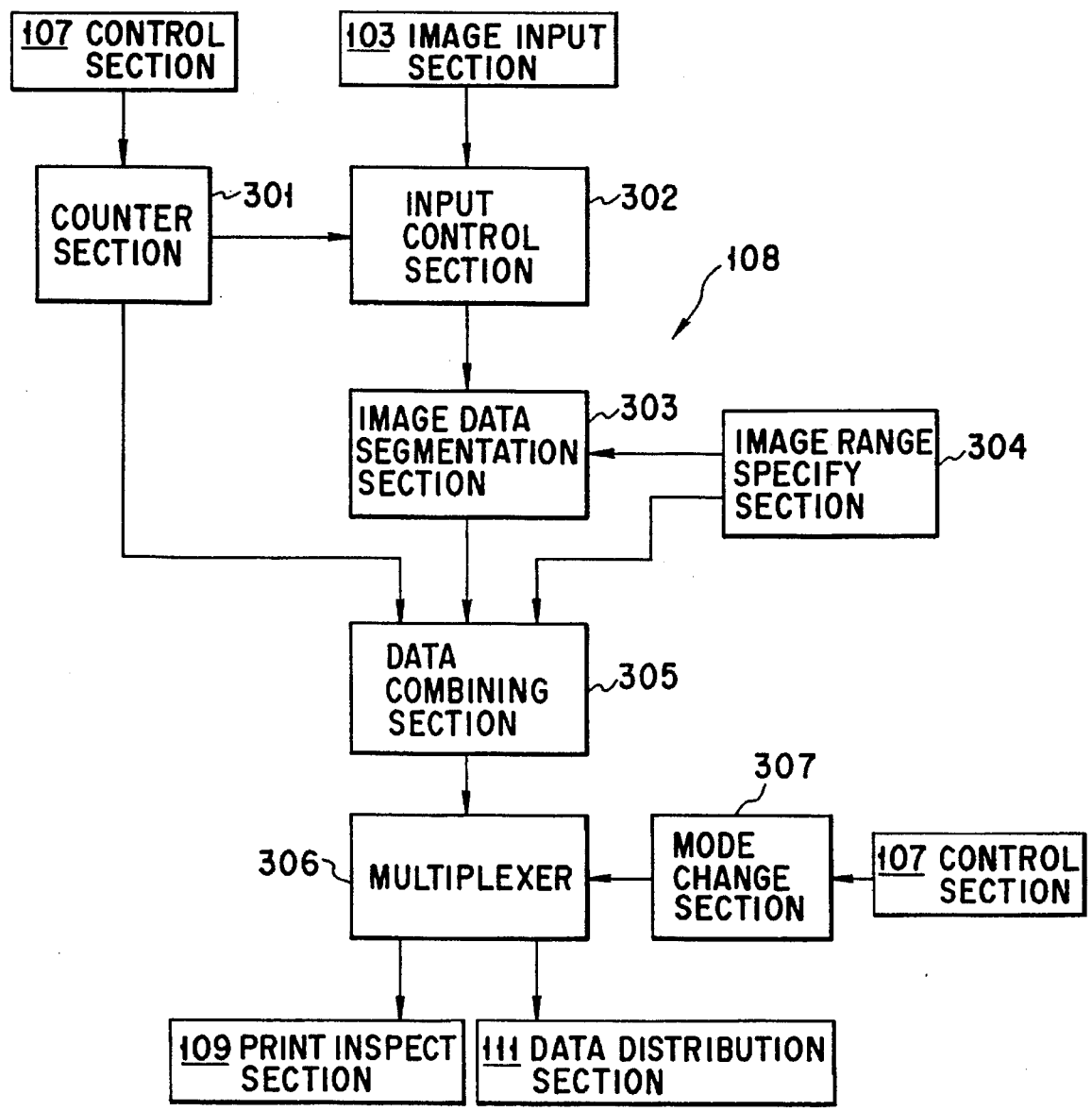
FIG. 2 is a schematic block diagram of the input data control section of FIG. 1.

Hereinafter, referring to the accompanying drawings, embodiments of a printing and inspection apparatus according to the present invention will be explained.

FIG. 1 schematically shows the structure of a printing and inspection apparatus according to an embodiment of the present invention. The printing apparatus comprises: a sheet inlet section 101 that takes out sheets P to be printed, one by one; a transport mechanism 123 that is driven by a driving motor 124 and conveys the taken-out sheets P; a printer section 102 that prints on the conveyed sheets P; an image input section 103 that takes in images and includes a line sensor 122 for inputting the images on the printed sheets P; a print drier section 104 that dries the printed sheet P to fix ink on the sheet P; and a sort mechanism that sorts out acceptable printed sheets P from defective printed sheets P. The printing apparatus of FIG. 1 further comprises: a sort mechanism control section 105 that control the sort mechanism on the basis of the judgment result of the print state; a control section 107 that controls the entire apparatus; an input data control section 108 that controls the image input section 103; a print inspect section 109 that inspects the print state on the basis of image data; a data storage section 110 that stores the results of inspecting image data at the print inspect section 109; a data distribution section 111 that distributes the inspection results of image data inspected at the print inspect section 109; a judgment result collect section 113 that collects the results of judging whether the print state is acceptable or unacceptable, on the basis of the inspection result data; a judgment result memory section 112 that temporarily stores the judgment results; and an inspection station 115 that includes a plurality of data display sections 116, 117, . . . , 118 that display the image data that the print inspect section requires to undergo visual judgment and a plurality of judgment input sections that judge whether the print state is acceptable or unacceptable on the basis of the images displayed on the display sections 116, 117, . . . , 118.

A pattern drawn mostly in fine lines is printed on a sheet P to be inspected by an inspect sort unit 114 and the related inspection station 115 indicated by broken lines in FIG. 1. Since such a pattern is composed largely of fine lines, it is difficult to accurately inspect the pattern in an inspection made by comparing with a reference image explained later, due to errors in alignment or positional variations caused in printing. The sheet P is conveyed from the sheet inlet section 101 by the transport mechanism 123 to the printer section 102, image input section 103, print drier section 104, and sort mechanism 106. The printed matter is thereby sorted out between acceptable and unacceptable.

Hereinafter, each section of the printing apparatus of the invention shown in FIG. 1 will be described in detail.

The sheet inlet section 101 takes out sheets P one by one according to the control signal from the control section 107 and delivers it to the transport mechanism 106. The sheet P is conveyed by the transport mechanism 106 to the printer section 102. In the printer section 102, ink is applied to a letterpress formed on the basis of a specific manuscript. The printer section 102 is realized by a relief printing system where ink is transferred to paper, a planographic printing system where ink is applied to a letterpress formed on the basis of a specific manuscript, which is once transferred to a flat roller, which is thereafter transferred to the sheet P, or an intaglio printing system where ink is applied to an intaglio formed on the basis of a specific manuscript, the ink on whose surface is wiped once by a wiping roller and thereafter which is transferred to the sheet P, or a combination of these systems.

The image input section 103 reads the printed object from the printer section 102 as image data. Then, the input data control section 108 controls the image data outputted from the image input section 103 so that the printed matter P may be inspected every several sheets or only part of the print may be inspected. The input data control section 108 is realized by the circuit configuration as shown in FIG. 2, for example. Specifically, a counter section 302 counts the number of sheets P taken out by the sheet inlet section 101 and printed on the printer section 102, according to the control signal from the control section 107. The image data inputted from the image input section 103 is controlled by an input control section 302 so as to be taken in every a certain number of sheets of printed matter counted at the counter section 301. For example, to confirm print every other sheet, the counter section 301 controls the input control section 302 once for every two consecutive sheets of printed matter, and thereby the image data outputted from the image input section 103 is taken in by the input control section 302. When the counter section 301 outputs a control signal to the input control section 302 every sheet, this allows the input control section 302 to take in all the image data items on the printed matter.

What has been explained above is about a method of extracting data every a certain number of sheets and inspecting the print condition. The images of printed matter may be inputted at regular intervals and inspected. In this case, the input control section 302 may contain a timer, generate pulses at regular intervals, and take in images from the image input section 103 with the pulse generation timing. When printing is done at high speed and a large volume of printed matter is produced, inspection is performed more effectively at regular time interval than at a certain sheet-count interval.

The image data taken in by the input control section 302 is inputted to the image data segmentation section 303. The image data segmentation section 303 segments only part of the image of printed matter according to the segment specify signal from an image range specify section 304 that specifies the range of an image to be segmented. This reduces the amount of image data to be inspected. When the image range specify section 304 specifies the entire range of the image to be printed, this allows all of the image data to be inspected.

The image data segmented at the image data segmentation section 303 is inputted to a data combining section 305. The data combining section 305 combines three types of data: the image data outputted from the image data segmentation section 303, the count data about printed matter outputted from the counter section 301, and data indicating the range of the image outputted from the image range specify section 304. On the basis of these data items, the data about printed matter can be managed and the agreement between the actual printed matter and the sorting data be confirmed accurately. Only the collected image data can be sent to the next stage, without using the data combining section 305. In this case, although ID cannot be added to the data and thus the sorting of printed matter is impossible, whether any misprint has occurred can be inspected. These data items are thereafter inputted to a multiplexer 306, which switches the output of the specified data between the data distribution section 111 and the print inspect section 109, according to the mode signal from a mode change section 307 controlled by the control section 107. That is, the data in the multiplexer 306 is controlled by the mode change section 307. For example, when all the data outputted from the data combining section 305 is outputted to the data distribution section 111, the image data is not supplied to the print inspect section 109 and no data is stored in the data storage section 110. Instead, all printed matter is supplied to the inspection station 115 for the judge to make a judgment, thereby allowing the judge to sort out acceptable images from unacceptable ones on the printed matter in real time.

When the mode change section 307 is controlled so as to output the data specified by the multiplexer 306 to the print inspect section 109, data is supplied to the print inspect section 109, which inspects the print. This print inspection provides an automatic print inspection or an auxiliary print inspection. The operation of the mode change section 307 will be explained in more detail later with reference to FIG. 16.

Figure 3:
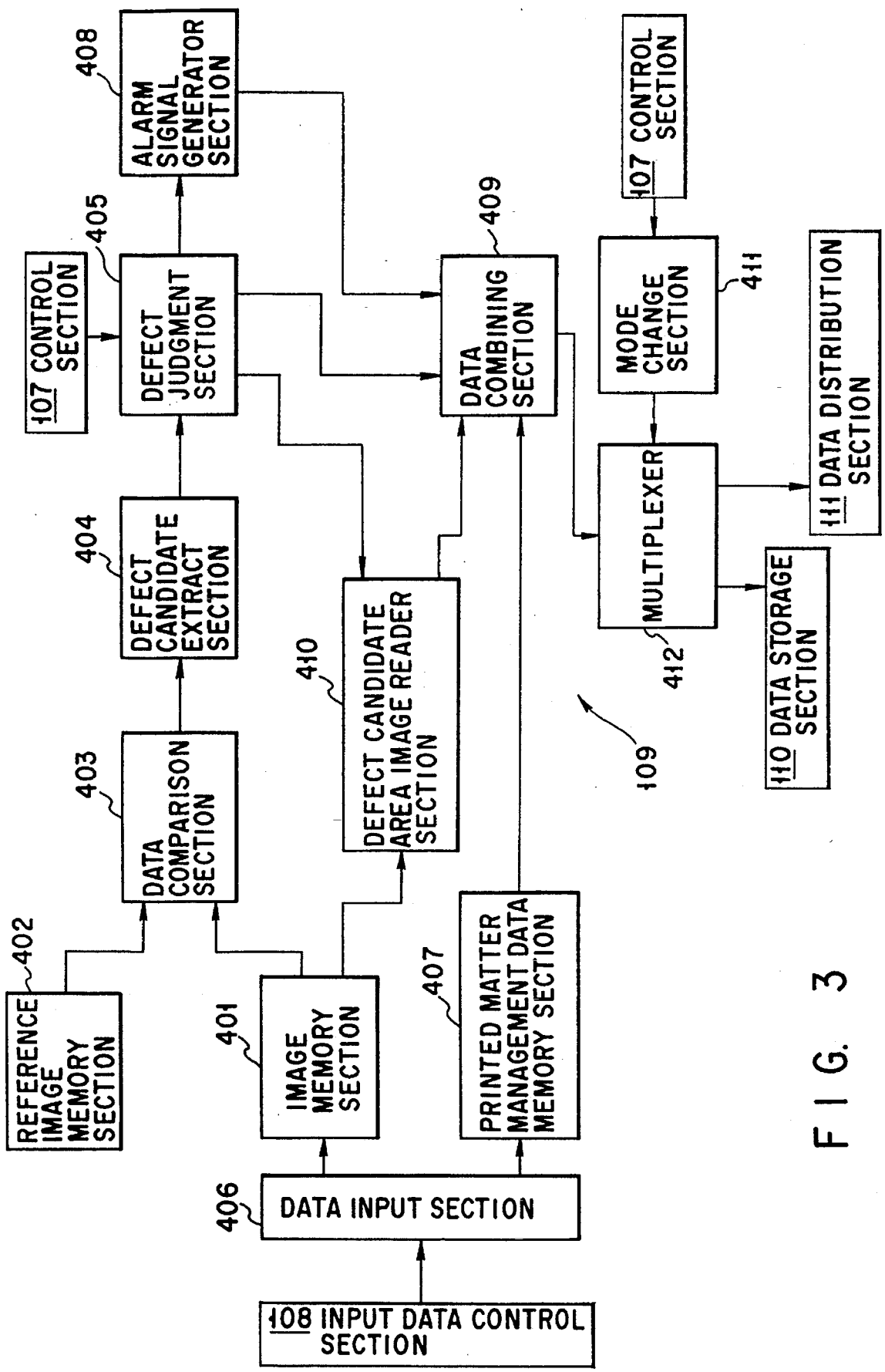
FIG. 3 is a schematic block diagram of the print inspect section of FIG. 1.

The print inspect section 109 can be realized by the block circuit as shown in FIG. 3, for example. The image data collected at the input data control section 103 is stored in an image memory section 401 via an data input section 406 in an arrangement as shown in FIG. 4, for example. In the example, image data is composed of 1024 pixels in column and 512 pixels in row and each pixel is stored in the form of data of 256 levels. It is assumed that there is no variation in the print position and the image data is always stored in a fully aligned state. If a variation in the position takes place, the position may be corrected by a known method, for example, by detecting the location of the matrix image data along the row and column to determine the starting position of the print pattern, and correcting the position.

Then, the stored image data is inputted to a data comparison section 403. The data comparison section 403 compares the image data stored in the image memory section 401 with the reference image data stored in the reference image memory section 402, and obtains the value of the difference between them pixel by pixel. For example, when the data comparison section 403 obtains the difference between the image data as shown in FIG. 4 stored in the image memory section 401 and the image data as shown in FIG. 6 stored in the reference image memory section 402, it provides the image data as shown in FIG. 6.

The data comparison section 403 is realized by the circuit configuration as shown in FIG. 7, for example. Specifically, according to the address signal ARD1 generated at a buffer control section 801, the image data as shown in FIGS. 5 and 6 stored in the image memory section 401 and reference image memory section 402 are read out simultaneously. Then, a differential unit 802 obtains the differential value, and thereafter, the image data as shown in FIG. 6 corresponding to the differential value is stored in an image buffer 803 according to the address signal ARD1.

Figure 8:
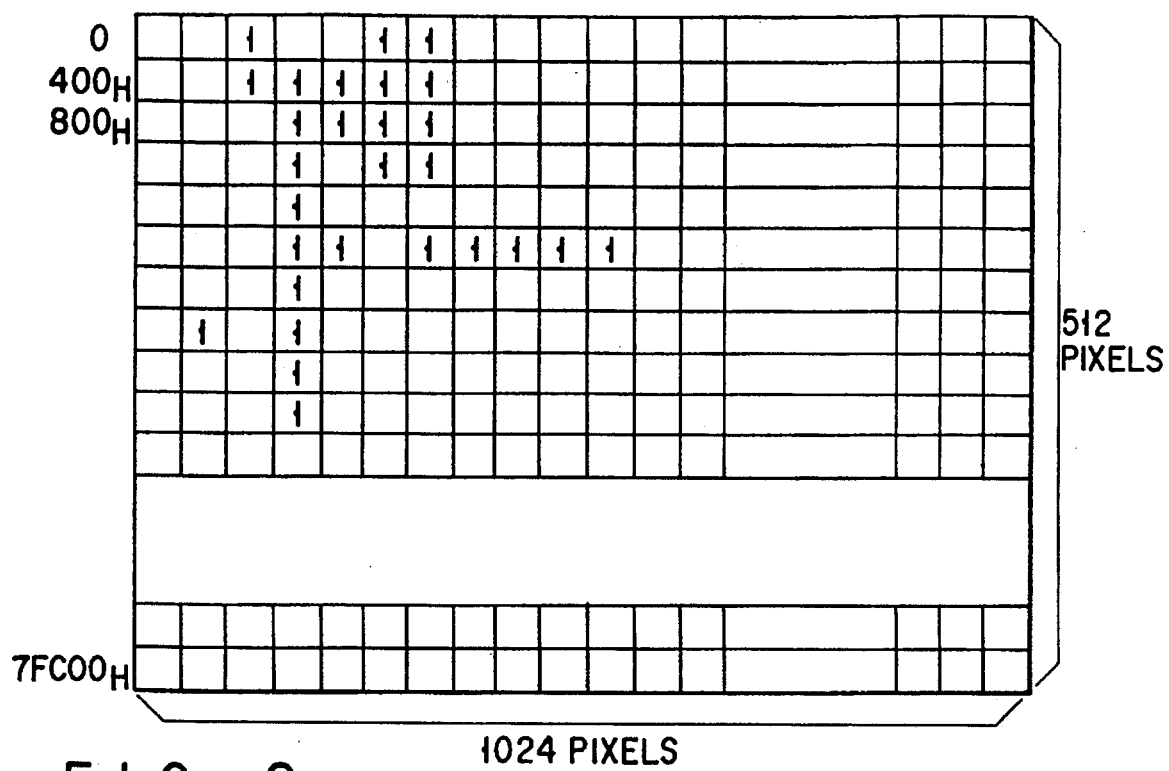
FIG. 8 illustrates an example of the data outputted from the defect candidate extract section of FIG. 3.
Figure 9:
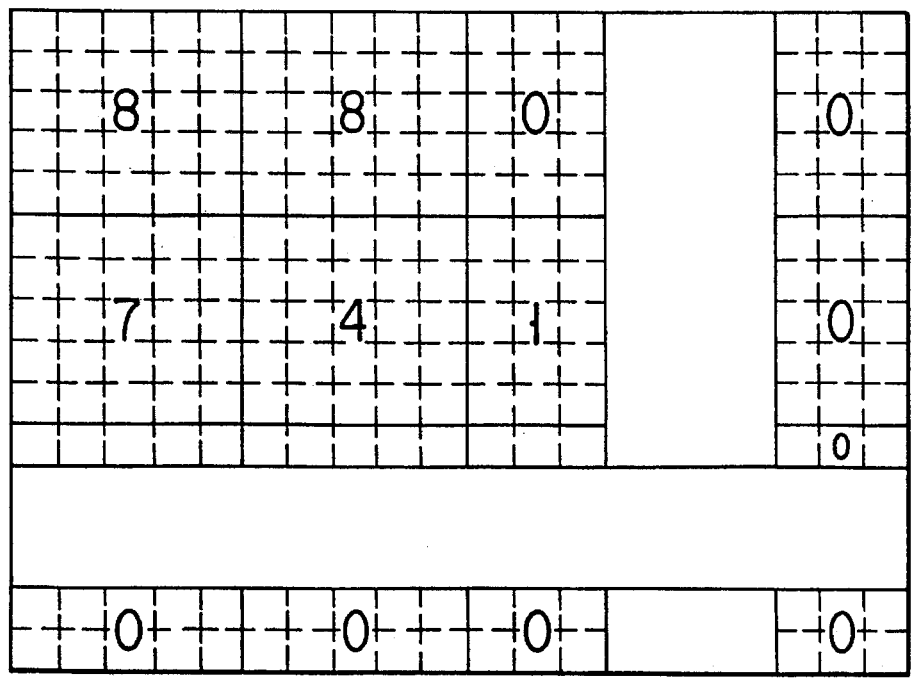
FIG. 9 illustrates another example of the data outputted from the defect candidate extract section of FIG. 3.

Then, the defect candidate extract section 404 sets a specific threshold value for the individual pixels of the differential image data stored in the data comparison section 403 and extracts pixels with a large density difference according to address ADR2 to obtain defect candidates, and counts the number of extracted pixels for each partial area. For example, when a threshold value less than −4 or more than 4 is set for the differential image data obtained at the data comparison section 403, as shown in FIG. 6, and the relevant pixels are extracted, the image data as shown in FIG. 8 will be obtained. The defect candidate extract section 404 divides the extracted image data into partial areas of 5 pixels in height and 5 pixels in width as shown in FIG. 9, and obtains the number of extracted pixels contained in each area. In FIG. 8, a pixel value of 1 indicates an extracted pixel and a pixel value of 0 indicates a blank.

The defect candidate extract section 404 can be concretely realized by the circuit shown in FIG. 10. Specifically, according to the address signal ADR2 generated by a buffer control section 1101, the differential data items stored in the data comparison section 401 are read into comparators 1102, 1103 one by one. The comparators 1102, 1103 have threshold signals THR1 and THR2 inputted. A threshold value of 4 is set for threshold signal THR2 and a threshold value of −4 is set for threshold signal THR3. Therefore, when the pixel value is less than −4 or more than 4, the comparators 1102, 1103 produce comparison outputs, which are supplied to a logical add circuit 1104. As a result, the logical add circuit 1104 outputs "1" when the pixel value is less than −4 or more than 4, and outputs "0" when the pixel value is in the ranges other than the above ranges. The output data is stored in an image buffer 1108. At the same time, an address conversion section 1106 outputs the integral part of the value obtained by dividing the row coordinate value and colum coordinate value indicated by address value ARD2 by "5", as a new address. Only when the differential result is extracted from the logical add circuit 1104, a memory data add section 1105 increases the output from the logical add section 1104 by "1" and supplies the increased output to an image buffer 1107. Using the new address outputted from the address conversion section 1106, the output is stored in an image buffer 1107 as the pixel value in the 5×5 partial area, and the number of extracted pixels is counted.

Figure 11:
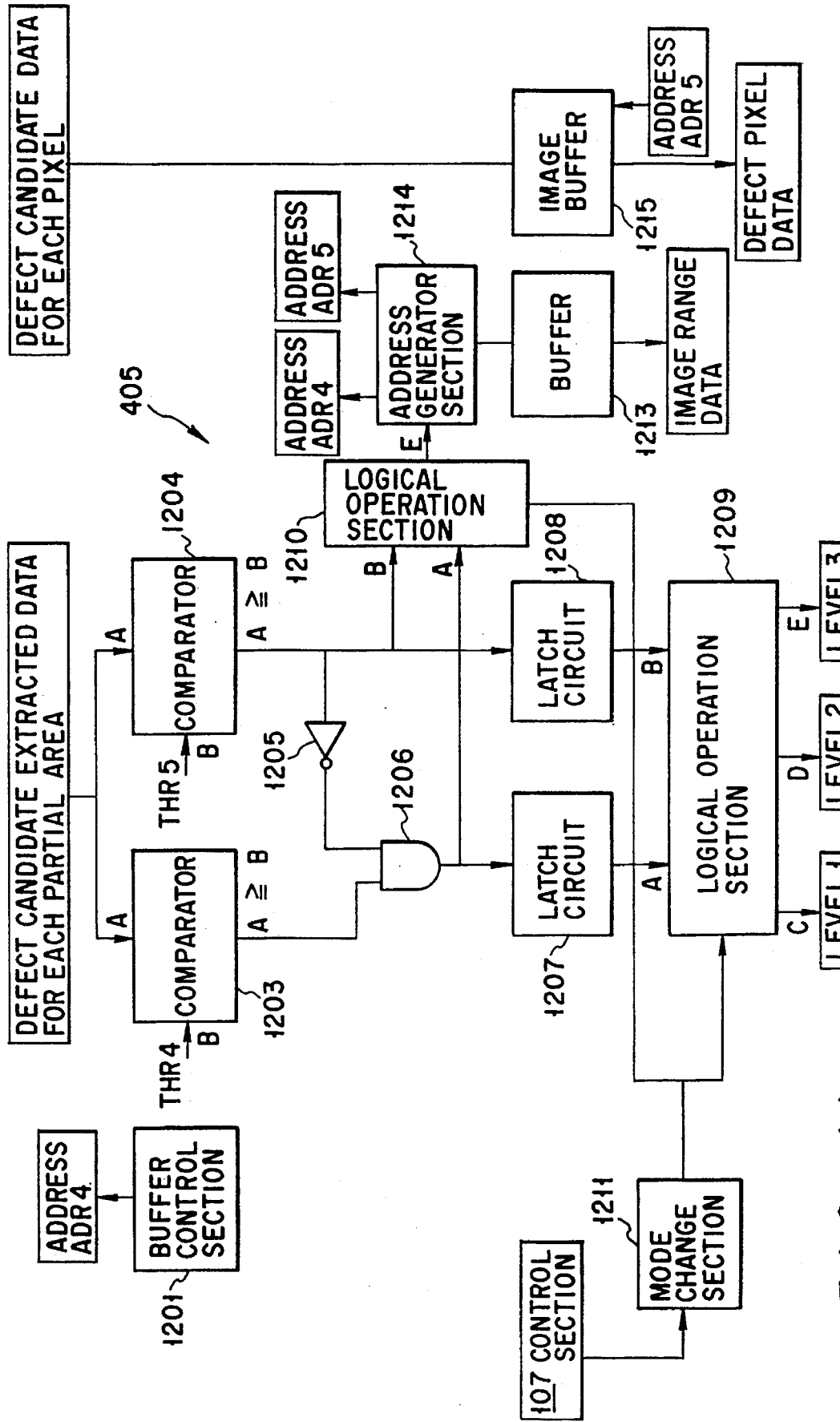
FIG. 11 is a schematic block diagram of the defect judgment section of FIG. 3.

Then, on the basis of the count results of extracted pixels in each partial area obtained from the image buffers 1108 and 1107 of the defect candidate extract section 404, a result judgment section 405 classifies the objects to be inspected into two or three levels. The defect judgment section 405 is realized by the circuit as shown in FIG. 11. Specifically, when the buffer control section 1201 outputs address signal ADR4, the number-of-pixels data on defect candidates in each partial area is read from the image buffer 1107 of the defect candidate extract section 404 as defect candidate extraction data for each partial area into comparators 1203, 1204. In the comparators 1203, 1204 where threshold signals THR4 and THR5 are set at 2 and 5 respectively, the threshold signal THR4, THR5 are compared with the number-of-pixels data. The output of the comparator 1204 is inverted at an inverter circuit 1205 and the inverted signal is outputted to a logical product circuit 1206. The logical product circuit 1206 produces the logical product of the inverted output and the output of the comparator 1203. The logical product output and the output value of the comparator 1204 are judged at a logical operation section 1210. The logical operation section 1210 outputs a control signal to an address generator section 1214 when it is necessary to transfer image data to the inspection station 115. The logical operation section 1210 has the same structure as that of another logical operation section 1209. Under the control of a mode change section 1211, the logical operation section 1210, receiving two inputs A and B, produces three logical operation results C, D, and E. These outputs C, D, and E mean "sorted as acceptable at the sort mechanism 106", "sorted as unacceptable at the sort mechanism 106", and "confirmed at the inspection station 115," respectively. Therefore, the logical operation section 1210 transfers the output data related to "confirmed at the inspection station 115" to the address generator section 1214, and converts the address signal for the partial area into the ranges of row coordinates and column coordinates of the image in the partial area, and into its address signal ADR5. The coordinate ranges of the image are stored in a buffer 1213. The defect candidate data for each pixel read from the defect candidate extract section 404 using address signal ADR5 is stored in an image buffer 1215. Whether or not all the outputs of the logical product circuit 1206 and comparator 1204 obtained in all the partial areas have become "1" is held in latch circuits 1207, 1208. Namely, the latch circuit 1208 outputs "1" when at least one logical product circuit 1206 outputs "1" in the entire area of the image. The latch circuit 1207 outputs "1" when at least one comparator 1204 outputs "1" in the entire area of the image. Then, the logical operation section 1209 uses the output data items from the latch circuits 1207, 1208 as data items A and B, and performs logical operation on A and B, and produces operation results C, D, and E in the form of level 1, level 2, and level 3. In the logical operation performed in the logical operation circuit 1209, its contents are changed to one of four modes under the control of the mode change section 1201, as shown in FIG. 12. The judgment of level 1, level 2, and level 3 is outputted as one of the judgment results of the print inspect section 109. When the output C of level 1 in the logical operation section 1209 becomes "1", the alarm signal generator section 408 of FIG. 3 receives the signal and outputs an alarm signal. Then, on the basis of data about the image range to be transmitted to the inspection station 115 stored in the buffer 1213 of the defect judgment section 405, a defect candidate area image reader section 410 reads the partial area from the image memory section 401. Of the data received by the data input section 406, the printed matter management data on the basis of the count of printed matter is stored in a printed matter management data memory section 407.

The data combining section 409 receives the printed matter management data outputted from the printed matter management data memory section 407, the image data outputted from the defect candidate area image reader section, the alarm signal outputted from the alarm generator section 408, and three levels of the inspection results and the defect candidate extract data for each pixel outputted from the defect judgment section. These data items pass through the multiplexer 412, which switches the output destination under the control of the mode change section 411, and are outputted to either the data storage section 110 or the data distribution section 111.

As long as the output has a plurality of judgment levels, such as level 1, level 2, and level 3 as shown in FIG. 16, the print inspect section 109 may have a structure other than that shown in FIG. 3. For instance, it may have the following structure.

For example, the print inspect section 109 can be realized by the circuit configuration as shown in FIG. 13. Specifically, the image data of the printed matter outputted from the input data control section 108 and the print management data are stored in the image memory section 2401 and the printed matter management data memory section 2407 via the data input section 2406. The image data stored in the image memory section 2401 is masked by the mask image data stored in a mask image memory section 2402 to extract only the image data in the desired image area into a data mask section 2403. A data average section 2404 obtains the average pixel density value in the desired area. The mask image memory section 2402 stores data for the printed matter of FIG. 2, for example. According to the data, the data mask section 2403 extracts only areas 2502 and 2503 where there is no print. The data average section 2404 examines the average density and senses whether or not there is any extra print in the printless area.

The defect judgment section 2405 compares the average density data AVE outputted from the data average Section 2404 with the threshold signals THR4, THR5 and makes a judgment according to the inspection mode controlled by the control section 107. The defect judgment section 2405 can be realized by the circuit as shown in FIG. 14. Specifically, comparators 2601, 2602 compare the average density value in the printless area outputted from the data average section 2404 with the respective threshold signals THR4 and THR5. A logical product section 2606 judges the logical product of the output value from an inverter circuit 2603 that inverts the output of the comparator 2602 and the output value from the comparator 2601, and the output of the comparator 2602. The inspection results are outputted in three levels, level 1, level 2, and level 3. The logical operation section 2606 receives the mode signal from the control section 107 via the mode change section, and execute logical operation as shown in FIG. 12. The logical operation section 2606 outputs the judgment result of level 1, level 2, or level 3 according to the mode. The output is the output of the defect judgment section.

When the defect judgment section 2405 outputs the judgment result of level 2, an alarm signal generator section 2408 outputs an alarm signal for urging an immediate measure for the printer section 102.

A data combining section 2409 outputs the image data stored in the image memory section 2401 in the case of level 3, and the alarm signal outputted from the alarm signal generator section 2408 in the case of level 2, in addition to the printed matter management data stored in the printed matter management data memory section 2407 and the judgment result.

Under the control of the mode change section 411, a multiplexer 412 switches the output of the data combining section 2409 between the data storage section 110 and the data distribution section 111.

Figure 15:
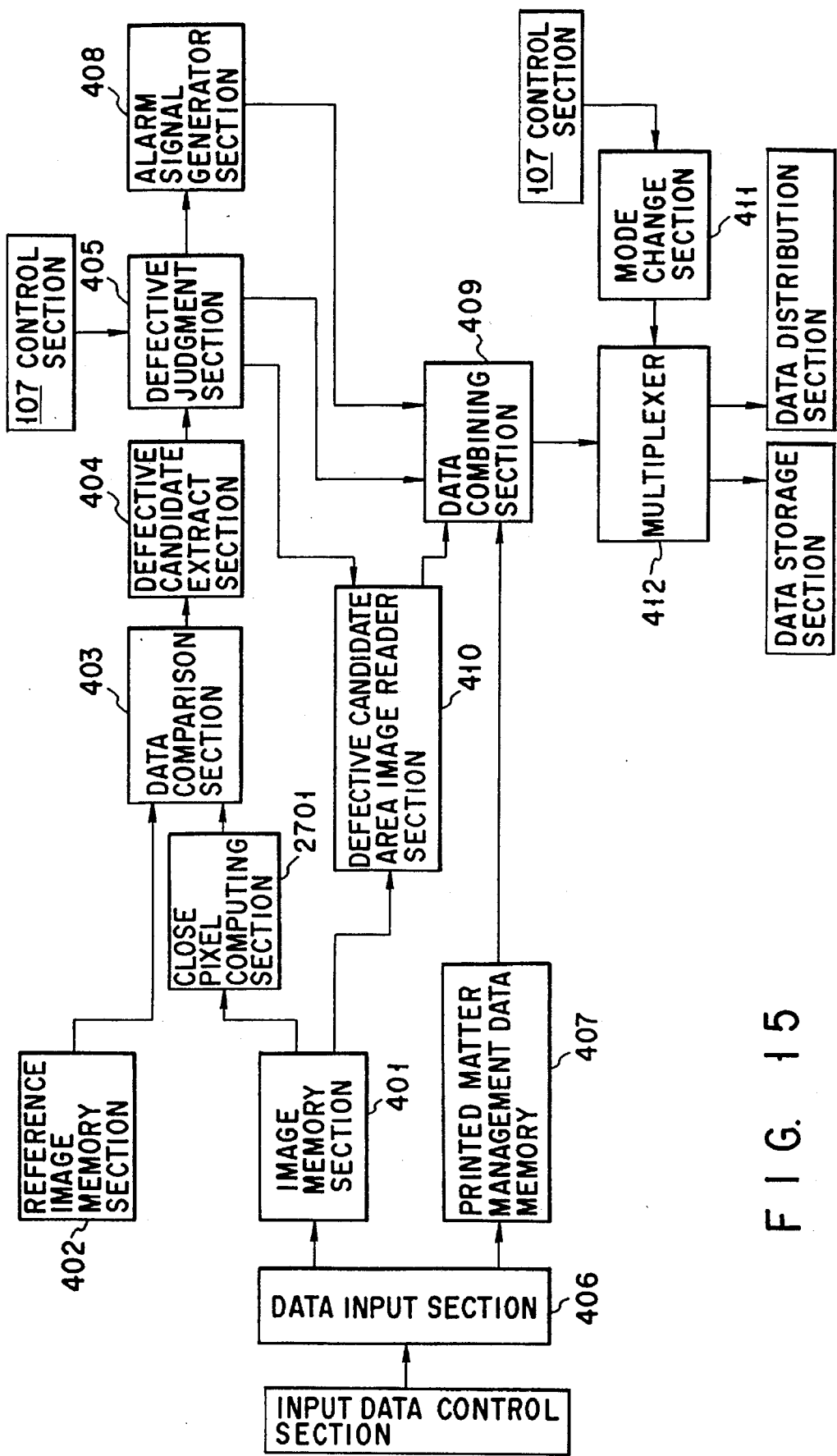
FIG. 15 is still another schematic block diagram of the print inspect section of FIG. 1.

The print inspect section 109 may be also realized by the circuit as shown in FIG. 15. The circuit configuration of FIG. 15 is obtained by adding a close pixel computing section 2701 to the circuit configuration of FIG. 3, so that explanation of the remaining components will be omitted.

The close pixel computing section 2701 performs suitable weighting, product, and add operations on each one of the image data items stored in the image memory section 401, for example, close 3×3 pixels, centering on the desired pixel. Specifically, if the image data stored in the image memory section 401 is expressed as f(i, j), the process of multiplying close pixel values f(i−1, j−1), f(i−1, j), f(i−1, j+1), f(i, j−1), f(i, j), f(i, j+1), f(i+1, j−1), f(i+1, j), and f(i+1, j+1) by the weight of FIG. 18B for each pixel, finding the sum of these, and converting the result into the desired pixel. In addition to the value of FIG. 18B, the weight may be a combination of given values as shown in FIGS. 18C, 18D, and 18E, for example. In the reference image memory section 402, the reference image data processed at the close pixel computing section 2701 is previously stored.

The data outputted from the multiplexer 412 has the structure as shown in FIG. 17. Specifically, for level 1, management data (ID) on printed matter and the judgment result are outputted; for level 2, ID of printed matter, the judgment result, and printing defects as alarm data are outputted; and for level 3, ID of printed matter, the judgment result, the number of candidate partial areas, the coordinate value of each partial area, each image data item, and defect candidate extraction data for each pixel are outputted. In the example of FIG. 17, when ID is 0021, a judgment is made for level 1 of "sorted as acceptable at the sort mechanism 106" and alarm data is created; and when ID is 0022, a judgment is made for level 2 of "sorted as unacceptable at the sort mechanism 106" and alarm data is created. Furthermore, when ID is 0023, a judgment is made for level 3 of "confirmed at the inspection station 115", and the number-of-areas "2", the x-coordinate value and y-coordinate value of two candidate areas, each image data item, and the defect candidate extraction data for each pixel are outputted.

If these data items are outputted from the multiplexer 412 to the data distributor 111 under the control of the mode change section 411, they are transferred to the inspection station 115 without being stored in the data storage section 110, with the result that the size of apparatus can be reduced provided that real time processing is possible. Additionally, if the mode change section 411 controls the multiplexer 412 so that these output data items may be supplied to the data storage section 110, waiting can be done when the processing capability of the inspection station 115 drops instantaneously. The operation of the mode change section 411 will be explained later in more detail with reference to FIG. 20.

Figure 18:
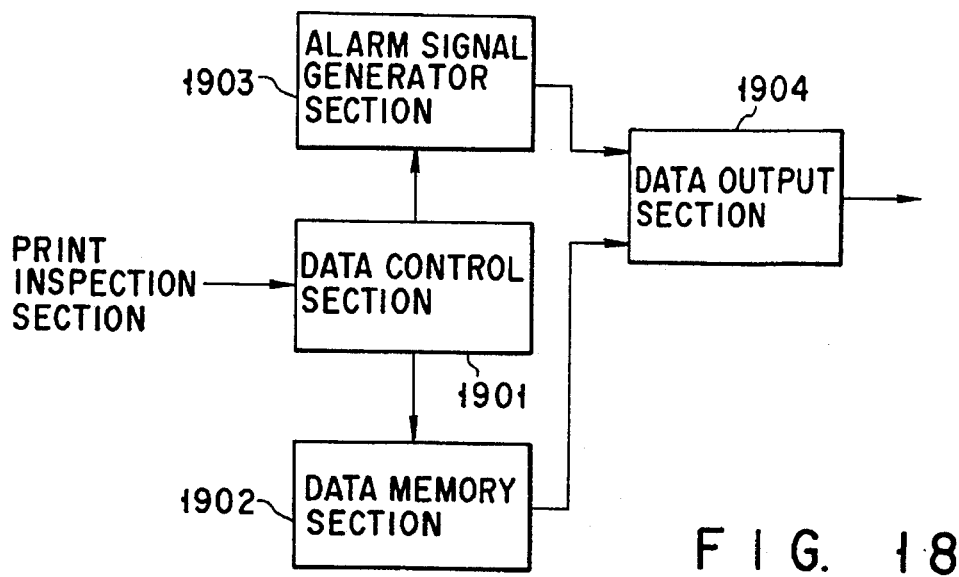
FIG. 18 is a schematic block diagram of the data storage section of FIG. 1.

The data storage section 110 can be realized by the circuit as shown in FIG. 18, for example. Specifically, a data control section 1901 temporarily stores the data outputted from the print inspect section 109 in a data memory section 1902, which outputs the data via a data output section 1904. The data memory section 1902 has a known first-in first-out memory structure where the first written-in data is read out first. The memory section has the function of a delay element that absorbs an insufficient processing capability, when the inspection result data continuously outputted from the print inspect section 109 is too much for the processing at the inspection station 115 where a final judgment is made on whether print is acceptable or unacceptable.

When the data received from the print inspect section 109 contains an emergency signal, and when the data memory section 1902 contains a data waiting for processing, the data control section 1901 operates the alarm signal generator section 1093, thereby outputting an alarm signal via the data output section 1904 in the form of separate signals.

Figure 19:
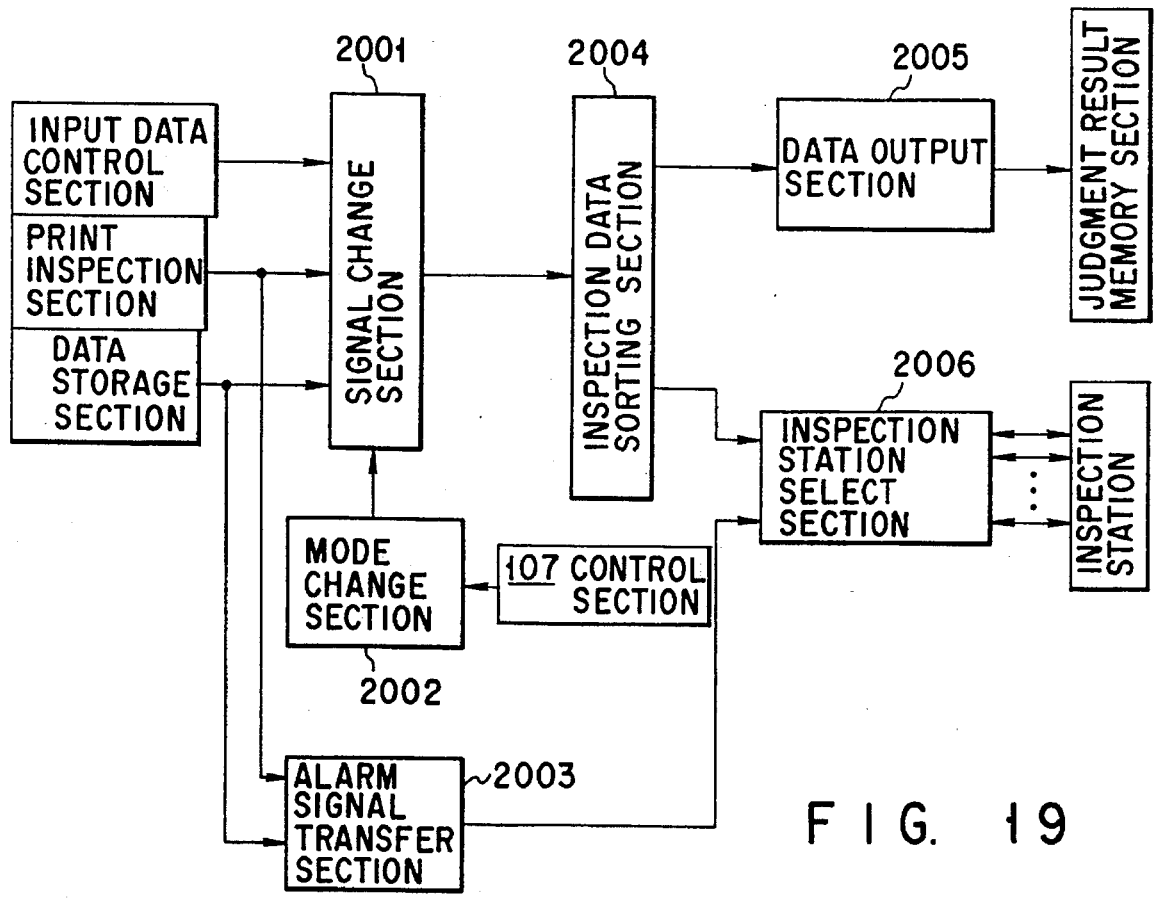
FIG. 19 is a schematic block diagram of the data distribution section of FIG. 1.

Then, the data distribution section 111 transfers the outputs from the input data control section 108, print inspect section 109, and data storage section 110 to the judgment result memory section 12. The data distribution section 111 is realized by the circuit configuration as shown in FIG. 19, for example. Specifically, under the control of a mode change section 2002, a signal change section 2001 selects one of the data items outputted from the input data section 108, print inspect section 109, and data storage section 110, and supplies it to an inspection data sorting section 2004. The sorting section transfers the data to a judgment result memory section 112 via a data output section 2005 and to the inspection station 115 via an inspection station select section 2006. An alarm signal transfer section 2003 transmits the alarm signals outputted from the print inspect section 109 and data storage section 110 to a data output section 2004. The inspection station 115 outputs these data items via the inspection station select section 2006.

Figure 20:
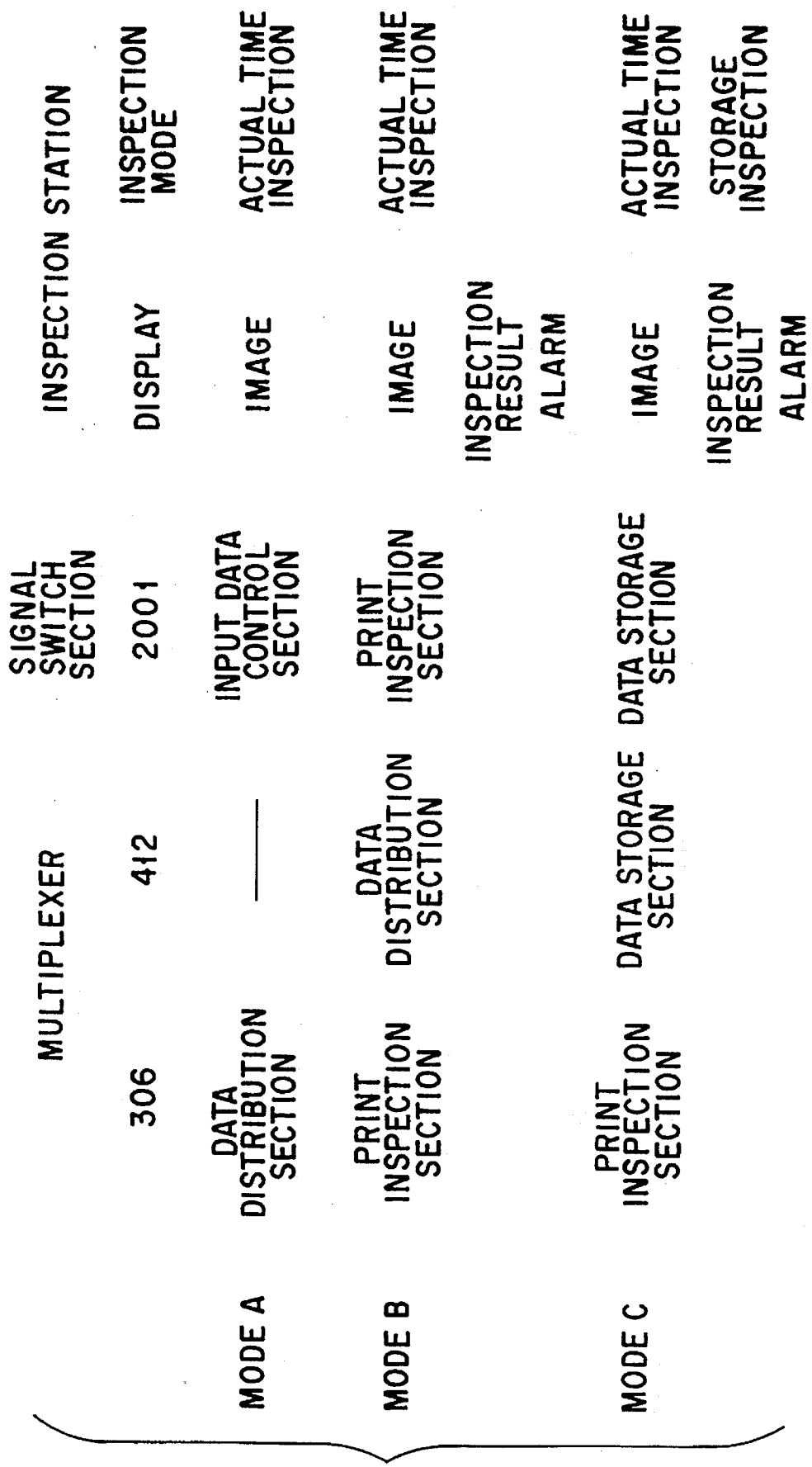
FIG. 20 shows the modes switched at the mode change section of FIG. 19.

A mode change section 2003 has at lest three modes shown in FIG. 20, and controls the input signal of the signal change section 2001 according to the inspection mode. At the same time, the aforementioned multiplexers 306, 412 are also switched as shown in FIG. 20. The inspection mode A, mode B, and mode C in FIG. 20 and the inspection mode 1, mode 2, mode 3, and mode 4 in FIG. 12 are switched by the control section 107, and thereby a suitable inspection mode can be selected according to the type of printed matter.

Whether an inspection data select section 2009 supplies the output to the judgment result memory section 112 via the data output section 2005 or to the inspection station 115 via the inspection station select section 2006 is determined according to the rules that the select section supplies the output to the inspection station select section 2006 when the output E of the logical operation section 1209 in the defect judgment section 405 of the print inspect section 109 is "1" or of level 3 for any mode shown in FIG. 17, and to the data output section 2005 when the output E is "0", or of level 1 or level 2.

The data output section 2005 transfers management data (ID) on printed matter and data of Judgment result level 1 or level 2 to the judgment result memory section 112. The inspection station select section 2006 searches the inspection station 115 for idle ones of the data display sections 1 to N (116, 117, . . . , 118), and transfers their IDs, the number of partial areas, coordinate data on the partial areas, image data on the partial areas, defect candidate data for each pixel on the partial areas. Furthermore, the inspection station select section 2006 transfers the alarm signal outputted from the alarm signal transfer section 2003 to the inspection station 115. The alarm signals outputted from the alarm signal transfer section 2003 include two types of signals: a signal indicating that the print inspect section 109 has sensed a fatal defect in print and an immediate measure should be taken for the printer section 102, and a signal for urging the confirmation of the data display section being inquired in the inspection station 115 to which the data storage section 110 outputs data.

Figure 21:
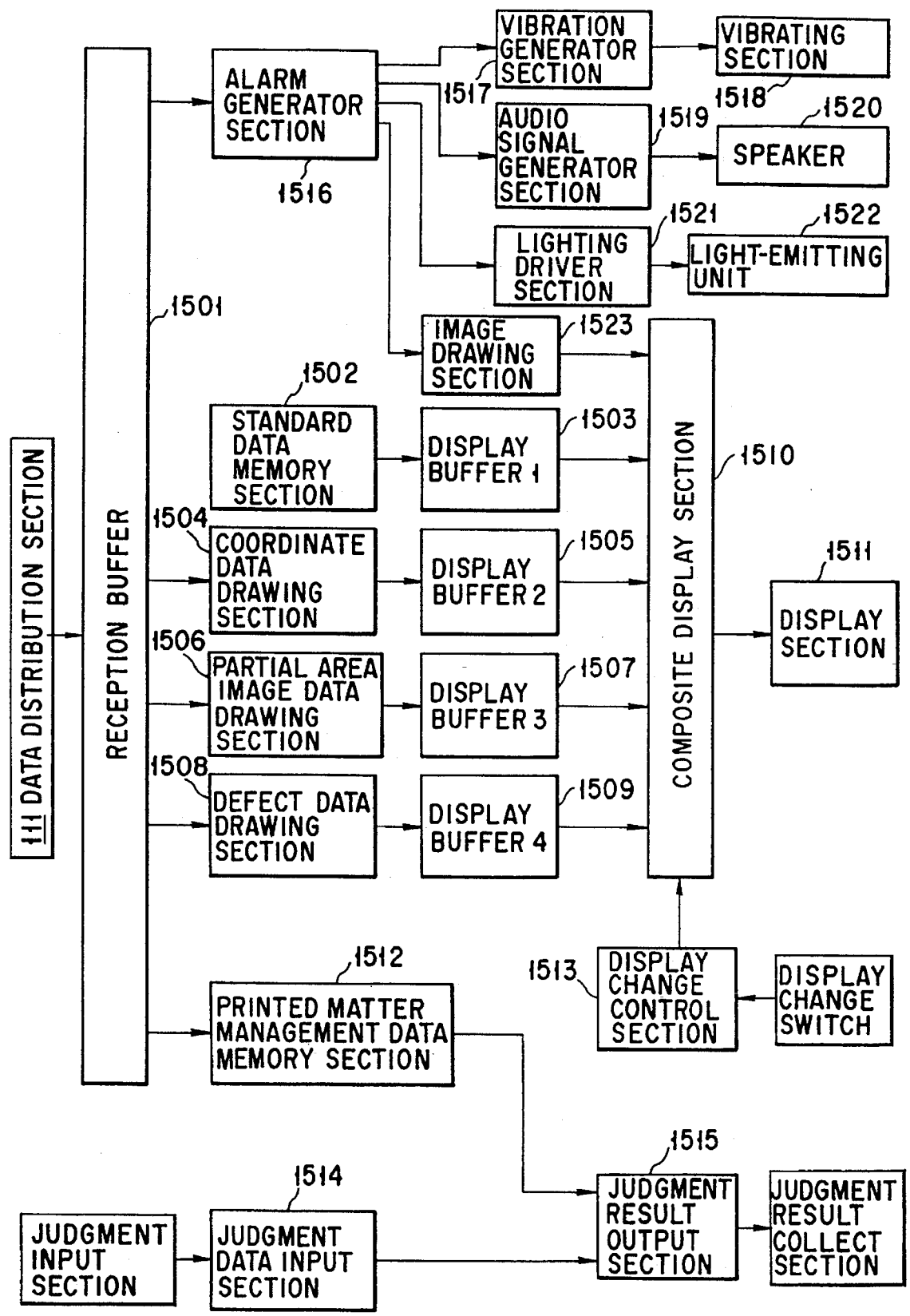
FIG. 21 is a schematic block diagram of the data display section of FIG. 1.

The data display sections 1 to N (116, 117, . . . , 118) has the functions of displaying the data outputted from the data distribution section 111, collecting the judgment data items from the judge, and outputting the collected data to the judgment result collect section 113. They are realized by the circuit configuration as shown in FIG. 21. Specifically, in each of the data display sections 1 to N (116, 117, ..., 118), a reception buffer 1501 receives the data outputted from the data distribution section 111, and transfers the alarm signal, printed matter management data (ID), coordinate data on the partial areas, image data on the partial areas, and defect candidate extraction data for each pixel on the partial areas to an alarm generator section 1516, a printed matter management data memory section 1512, a coordinate data drawing section 1504, partial area image data drawing section 1506, and a defect data drawing section 1508, respectively. The display buffer 1 (1503) displays image data of the standard print stored in a standard data memory section 1502 on a display section 1511 via a composite display section 1501. At the same time, the coordinate data drawing section 1504 overwrites the range of the partial area determined to be of level 3 at the print inspect section 109 on the standard data via the display buffer 2 (1505) and composite display section 1510 in the form of outer frames at the coordinates indicated by numerals 1601 and 1602. Then, the drawing section displays the resulting image on the display section 1511. The partial area image data drawing section 1506 overwrites the image data in the partial area on the standard data via the display buffer 3 (1507) and composite display section 1501, and displays the resulting image on the display section 1511. The defect data drawing section 1508 overwrites the sensed defect candidate data for each pixel in the partial area on the image data in the partial area via the display buffer 4 (1509) and composite display section 1510, and displays the resulting image on the display section 1511. A display change control section 1513 senses the signal from a display change switch 1606 operated by the judge and controls the composite display section 1510, thereby being able to switching between the process of not displaying the data as indicated by numeral 1603 and the process of displaying the data as indicated by numeral 1604. In the case of inspection mode A of FIG. 20, since the print inspect section 109 is not operated, only the image of printed matter is displayed on the display section 1511. On the basis of this, the judge makes a judgment.

Figure 22:
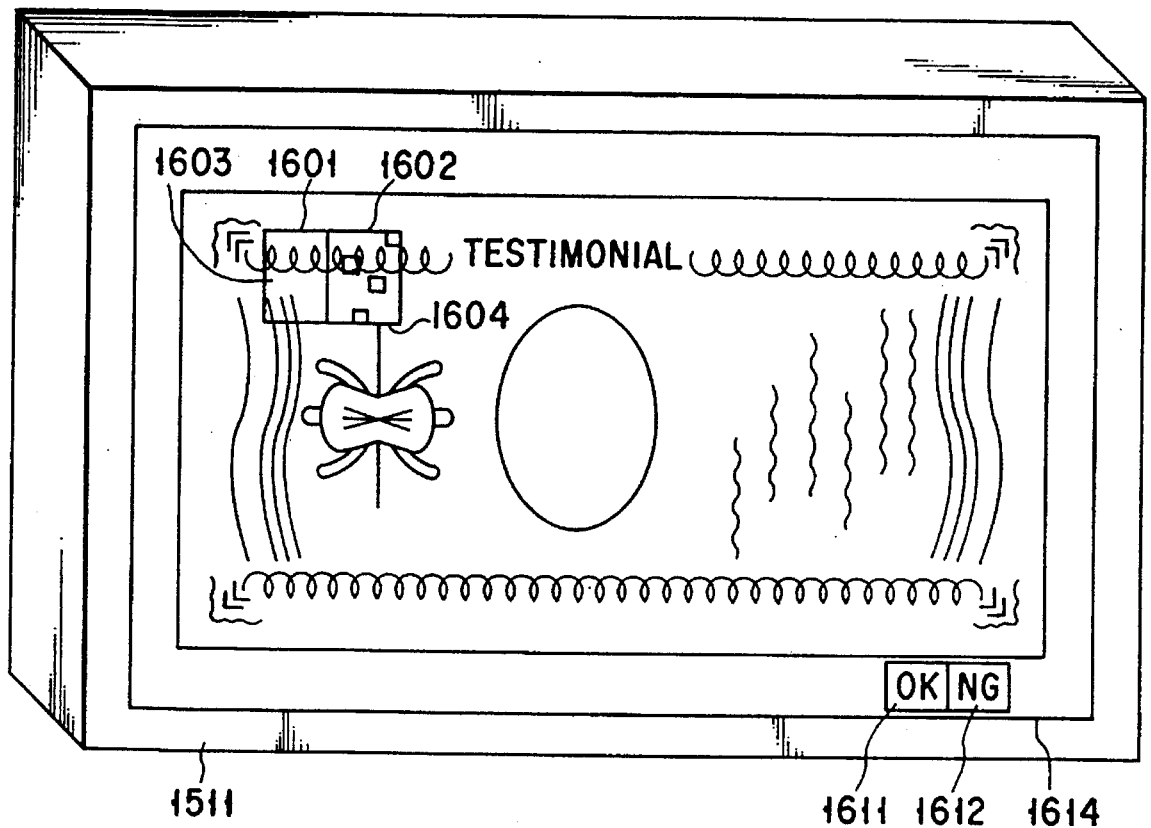
FIG. 22 is a schematic perspective view of the data display section of FIG. 1.

In this way, the print inspect section 109 displays the sense result of the data of the printed object judged to be of level 3 as shown in FIG. 22. Looking at the display, the judge makes a final judgment whether the object is of level 1 (e.g., acceptable) or of level 2 (unacceptable).

Seeing the display as shown in FIG. 22, the judge presses either an acceptable print switch or an unacceptable print switch (not shown) in the judgment input section 1607 to make a judgment for level 1 (e.g., acceptable print) or level 2 (e.g., unacceptable print). The judgment results are connected by the judgment data input section 1514. A judgment result output section 1515 outputs the collected results together with the printed matter management data on the object stored in the printed matter management data memory section 1512 to the judgment result collect section 114.

In addition to the above example, the judgment input section may be realized by a mouse unit (not shown), with which the mouse cursor 1614 is moved to the acceptable and unacceptable judgment representations 1611 and 1612 on the screen and the desired one is specified by pressing a mouse button.

Furthermore, the judgment input section 1607 may be realized by a transparent pressure-sensitive sensor put on the display section 1511, with which the judge specifies either representation 1611 or 1612 indicating acceptable print or defective print, with his fingertip or a pen.

The alarm generator section 1516 informs the judge of the alarm signal via a vibrating section 1518 driven by a vibration generator section 1517, a speaker 1520 driven by an audio signal generator section 1519, a light-emitting unit 1522 driven by a lighting driver section 1521, and the display section 1511 on which the output of the image drawing section 1523 is drawn via the composite display section 1510. The aforementioned two alarm signals may be given through two separate means. They may be expressed and given in different ways. All of these methods are not necessarily needed, and some of them may be selected as the need arises.

The judgment result collect section 113 collects the judgment results outputted from a plurality of terminals in the inspection station 115, makes a final judgment on the object determined to be of level 3 or the object not determined to be of any level as to level 1 (e.g., acceptable print) and level 2 (e.g., unacceptable print), and outputs the judgment results together with the management data on the printed matter (i.e., data on the printing sequence) to the judgment result memory section 112.

The judgment result memory section 112 stores the printed matter management data and the judgment result of the object, level 1 (e.g., acceptable print) or level 2 (e.g., unacceptable print). For example, the data judged to be of level 3 by the print inspect section 109 or data storage section 110 as shown in FIG. 17 is judged by the judge and converted into the judgement data. The converted judgement data is stored in the judgment result memory section 112.

The printed matter which is printed on the printer section 102 and whose images are collected by the image input section 103, has its print fixed at the print drier section 104 until the print is judged to be of level 1 (e.g., acceptable print, or level 2 (e.g., defective print). The print drier section 104 is realized by a method of applying heat uniformly to promote the fixation of ink or a method of radiating ultraviolet rays to promote the fixation of ink. When time is needed to fix ink, the print drier section 104 lengthens the conveying distance of the transport mechanism 123 of FIG. 1, or temporarily stops the mechanism to cause a delay. In this case, to deal with the delay, the judgment memory section 112 stores the results until the fixation has finished. Conversely, when there has been a delay in sending the judgment result to the judgment result memory section 112, the driving motor 124 of the transport mechanism 123 in the sort mechanism control section 105 is stopped to deal with the delay.

Thereafter, on the basis of the data, the judgment result memory section 112 searches the object for judgment data items in the order of print numbers. The sort mechanism control section 105 controls the sort mechanism 106 so as to sort out the printed sheets on the basis of the judgment results.

Hereinafter, another embodiment of a printing apparatus according to the present invention will be explained.

FIG. 23 schematically shows the structure of a printing apparatus according to another embodiment of the present invention. The printing apparatus comprises a sheet inlet section 101, a transport mechanism 2107, two printer sections 102, 2101, two image input sections 103, 2102 containing line sensors 2108, 2109, a sort mechanism control section 105, a sort mechanism 106, a control section 107, input data control sections 108, 2103, print inspect sections 109, 2104, data storage sections 110, 2105, a data distribution section 2106, a judgment result collect section 113, a judgment result memory section 112, and a inspection station 115 composed of a plurality of data display sections and a plurality of judgment input sections.

The printing apparatus of FIG. 23 is obtained by adding another printer section and another image input and inspection system to the printing apparatus of FIG. 1. Normally two routes of inspection stations 115 would be needed, but the data distribution section 2106 distributes data items so that a single route of inspection station 115 may be sufficient. This realizes more efficient and more centralized judging work. Each component contained in the configuration of FIG. 23 is the same as that in the first embodiment, and their explanation will be omitted.

Hereinafter, still another embodiment of a printing apparatus according to the present invention will be explained.

FIG. 24 schematically shows the structure of a printing apparatus according to still another embodiment of the present invention. The printing apparatus comprises sheet inlet sections 101, 2102, a printer section 102, an image input section 103 containing a line sensor 2205, a printed matter stack section 2201, a sort mechanism control section 105, a sort mechanism 106, a control section 107, an input data control section 108, a print inspect section 109, a data storage section 110, a data distribution section 111, a judgment result collect section 113, a Judgment result memory section 112, and a inspection station 115 composed of a plurality of data display sections and a plurality of judgment input sections.

The printing apparatus of FIG. 24 differs from the printing apparatus of FIG. 1 in that after images are collected at the image input section 103, the printer sheet P is conveyed by the transport mechanism 2203 to the printed matter stack section 2201, which collects printed sheets, and thereafter, the printed sheets are taken out by the sheet inlet section 2202 and conveyed by the transport mechanism 2204 to the sort mechanism 106, which sorts out the printed matter P. The printing apparatus is useful when time is needed before judgment at the inspection station 115. Each component contained in the configuration of FIG. 24 is the same as that in the first embodiment, and their explanation will be omitted.

In the print inspection explained so far, just printed matter is sorted out between acceptable one and unacceptable or determined to be either acceptable or unacceptable. For another embodiment, a printing apparatus may be considered which enables the inspection station 115 to provide the inspector or judge with the state of print smoothly and easily. In this case, the judge need not judge between acceptable print and unacceptable print. The image data appearing on the inspection station 115 enables the judge to grasp a subtle print state in real time or smoothly. This effectively prevents defects in print, such as misprint due to the inadequate density of ink or the mixing of foreign matter.

With a conventional printing apparatus with a print inspection and sorting function, exact sorting is difficult. With the present invention, however, it is possible to realize a printing apparatus which prints while sorting out only acceptable printed sheets accurately without lengthening the processing time, by collecting final judgments made by the judge on the printed matter containing minute defects or faint defects that the inspecting process cannot judge. Since the final Judgment is made during the drying process, it is possible to sort out acceptable ones of printed matter in real time.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A printing apparatus comprising:

printing means for printing an image on a paper sheet;

reading means for reading the printed image on the paper sheet;

inspecting means for inspecting defects on the printed image supplied from the reading means to classify the printed image into one of acceptable print, unacceptable print, and judgment impossible;

data display means for displaying the image data outputted from said data inspecting means and classified as judgment impossible at said inspecting means;

evaluation data input means for inputting evaluation data about the image displayed on said data display means; and sorting means for sorting printed sheets on the basis of the data outputted from said data inspecting means and the data outputted from said evaluation data input means.

2. A printing apparatus according to claim 1, further comprising:

transport means for conveying a paper sheet from said printing means to said sorting means via said inspecting means.

3. A printing apparatus according to claim 2, further comprising:

drying means provided in a transport path between said image reading means and sorting means for drying a printed sheet, said reading means reading the image data from the printed sheet before drying.

4. A printing apparatus according to claim 3, further comprising:

evaluation data input means for inputting evaluation data used to evaluate the image displayed on said data display means before the drying of the sheet has finished, said sorting means sorting printed sheets on the basis of the evaluation data.

5. A printing apparatus according to claim 1, wherein said data display means includes:

a plurality of data display units for displaying image data;

data distribution means for distributing the data outputted from said image data reading means to said data display units; and a plurality of evaluation data input units provided so as to correspond to display units to which evaluation data used to evaluate the image displayed on said data display units is inputted, said sorting means sorting printed sheets on the basis of the evaluation data.

6. A printing apparatus according to claim 5, further comprising:

second image data reading means for reading the image on a printer sheet as image data, said data distribution means collecting the data items outputted from said first and second image data reading means and outputting them to said data display units.

7. A printing apparatus according to claim 1, wherein said image data reading section contains an image processing section for extracting images from a specified range.

8. A printing apparatus according to claim 1, wherein said data inspecting means contains memory means in which reference image data is stored, comparison means for comparing the inputted image data with the reference data and outputting the comparison data, defect candidate extraction means for extracting disagreement pixels outside a specified level range from the comparison data, means for measuring the number of extracted disagreement pixels for each of a plurality of image areas, and means for sorting image data items into three types, acceptable print, unacceptable print, and judgment impossible, on the basis of the measurement result.

9. A printing apparatus comprising:

printing means for printing images on a paper sheet;

image data reading means for reading images on a printer sheet as image data;

data inspecting means which inspects the quality of or the good or bad of the image data inputted from said image data reading means, and which contains:

memory means in which reference image data is stored;

comparison means for comparing the inputted image data with the reference image data and outputting the comparison data;

defect candidate extraction means for extracting disagreement pixels outside a specified level range as defect candidates from the comparison data;

means for measuring the number of extracted disagreement pixels for each of the predetermined image areas; and means for classifying image data items into three types, acceptable print, unacceptable print, and judgment impossible on the basis of the measurement result;

data display means for displaying the image data outputted from said data inspecting means and classified as judgment impossible at said inspecting means;

evaluation data input means for inputting evaluation data about the image displayed on said data display means; and sorting means for sorting printed sheets on the basis of the data outputted from said data inspecting means and the data outputted from said evaluation data input means.

10. A printing apparatus according to claim 9, wherein said sorting means contains:

first comparison means for comparing the count signal from said measuring means with a first threshold value and generating a first comparison signal;

second comparison means for comparing the count signal from said measuring means with a second threshold value larger than the first threshold value and generating a second comparison signal; and means for judging between acceptable print, unacceptable print, and judgment impossible on the basis of the first and second comparison signals.

11. A printing apparatus comprising:

printing means for printing images on a paper sheet;

image data reading means for reading images on a printer sheet as image data;

data inspecting means which inspects the quality of or the good or bad of the image data inputted from said image data reading means, and which contains:

memory means in which masking image data is stored;

masking means for masking the inputted image data with the masking image data and extracting the desired image data;

computing means for computing the average density of the desired image data and generating an average density signal; and means for classifying image data items into three types, acceptable print, unacceptable print, and judgment impossible on the basis of the average density signal;

data display means for displaying the image data outputted from said data inspecting means and classified as judgment impossible at said inspecting means;

evaluation data input means for inputting evaluation data about the image displayed on said data display means; and sorting means for sorting printed sheets on the basis of the data outputted from said data inspecting means and the data outputted from said evaluation data input means.

12. A printing apparatus according to claim 11, wherein said sorting means contains:

first comparison means for comparing the average density signal with a first threshold value and generating a first comparison signal;

second comparison means for comparing the average density signal with a second threshold value larger than the first threshold value and generating a second comparison signal; and means for judging between acceptable print, unacceptable print, and judgment impossible on the basis of the first and second comparison signals.

13. A printing apparatus comprising:

printing means for printing an image on a paper sheet;

image data reading means for reading the printed image on a printer sheet as image data including pixels;

data inspecting means which inspects the quality of or the good or bad of the image data inputted from said image data reading means, and which contains:

memory means in which reference data including reference pixels is stored;

means for replacing the pixels in the inputted image data into calculation pixels each of which is calculated and delivered from peripheral pixels arranged around the pixel of interest;

comparison means for comparing the replaced calculation pixel with the corresponding reference pixel in the reference image data and outputting the comparison data;

defect candidate extraction means for extracting disagreement pixels outside a specified level range as defect candidates from the comparison data;

means for measuring the number of extracted disagreement pixels for each of the predetermined image areas; and means for classifying image data items into three types, acceptable print, unacceptable print, and judgment impossible on the basis of the measurement result;

data display means for displaying the image data outputted from said data inspecting means and classified as judgment impossible at said inspecting means;

evaluation data input means for inputting evaluation data about the image displayed on said data display means; and sorting means for sorting printer sheeted on the basis of the data outputted from said data inspecting means and the data outputted from said evaluation data input means.

14. A printing apparatus comprising:

printing means for printing images on a paper sheet;

image data reading means for reading images on a printer sheet as image data;

comparison means for comparing the image data inputted from said image data reading means with reference image data and outputting defective image data;

data inspecting means which inspects the quality of or the good or bad of the print image from the defective image data, and which classifies image data items into three types, acceptable print, unacceptable print, and judgment impossible;

data display means which displays the image data outputted from said data inspecting means and classified as judgment impossible at said inspecting means, and which contains:

means for storing standard image data; and combining means for combining the defective image data and the standard image data, with the defective image data displayed in the standard image data;

evaluation data input means for inputting evaluation data about the image displayed on said data display means; and sorting means for sorting printed sheets on the basis of the data outputted from said data inspecting means and the data outputted from said evaluation data input means.

* * * * *